(12) United States Patent
Peng et al.

(10) Patent No.: US 12,326,644 B2
(45) Date of Patent: Jun. 10, 2025

(54) RECONFIGURABLE ALL-OPTICAL NONLINEAR ACTIVATION FUNCTIONS ON SILICON-INTEGRATED PLATFORM

(71) Applicant: HEWLETT PACKARD ENTERPRISE DEVELOPMENT LP, Houston, TX (US)

(72) Inventors: Yiwei Peng, Houston, TX (US); Yuan Yuan, Milpitas, CA (US); Stanley Cheung, Milpitas, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 351 days.

(21) Appl. No.: 17/963,027

(22) Filed: Oct. 10, 2022

(65) Prior Publication Data
US 2024/0118582 A1 Apr. 11, 2024

(51) Int. Cl.
*G02F 1/225* (2006.01)
*G02F 1/21* (2006.01)
(Continued)

(52) U.S. Cl.
CPC ............ *G02F 1/2257* (2013.01); *G02F 1/212* (2021.01); *G02F 1/365* (2013.01); *G06N 3/048* (2023.01);
(Continued)

(58) Field of Classification Search
CPC ........ G02F 1/212; G02F 1/225; G02F 1/2255; G02F 1/2257; G02F 1/35; G02F 1/3517;
(Continued)

(56) References Cited

U.S. PATENT DOCUMENTS 11,187,963 B2 * 11/2021 Huang ................. G02F 1/3517
2004/0208421 A1 * 10/2004 Kitagawa ............. G02F 1/3136
385/16

(Continued)

OTHER PUBLICATIONS

John E. Heebner and Robert W. Boyd, "Enhanced all-optical switching by use of a nonlinear fiber ring resonator," Opt. Lett. 24, 847-849 (1999), 3 pages. (Year: 1999).*

(Continued)

*Primary Examiner* — Daniel Petkovsek
*Assistant Examiner* — Emma R. Oxford
(74) *Attorney, Agent, or Firm* — Sheppard Mullin Richter & Hampton LLP

(57) ABSTRACT

Systems, devices, and methods are provided for all-optical reconfigurable activation devices for realizing various activations functions using low input optical power. The device and systems disclosed herein include a directional coupler comprising a first phase-shift mechanism and an interferometer coupled to the directional coupler. The interferometer comprises at least one microring resonator and a second phase-shift mechanism coupled to thereto. The interferometer and the directional coupler comprise waveguides formed of a first material, while the microring resonator comprises a waveguide formed of a second material and a third phase-shift mechanism. The second material is provided as a low-loss material having a high Kerr effect and large bandgaps, to generate various nonlinear activation functions. The first, second, and third phase-shift mechanisms are configured to control biases within the disclosed systems and devices to achieve a desired activation function.

20 Claims, 12 Drawing Sheets

(51) Int. Cl.
  *G02F 1/365* (2006.01)
  *G06N 3/048* (2023.01)
  *G06N 3/067* (2006.01)
(52) U.S. Cl.
  CPC ......... *G06N 3/067* (2013.01); *G02F 2203/15* (2013.01)
(58) Field of Classification Search
  CPC .... G02F 1/3521; G02F 1/365; G02F 2203/15; G06N 3/048; G06N 3/067; G06N 3/0675
  See application file for complete search history.

(56) References Cited

U.S. PATENT DOCUMENTS

| | | | |
|---|---|---|---|
| 2012/0039560 A1* | 2/2012 | Mazur | G02F 3/024 385/2 |
| 2020/0401012 A1* | 12/2020 | Xu | G02F 1/353 |
| 2021/0278743 A1* | 9/2021 | Huang | G02F 1/225 |
| 2022/0229316 A1* | 7/2022 | Cohen | G02F 1/2257 |
| 2024/0120706 A1* | 4/2024 | Papp | H01S 5/026 |
| 2024/0231180 A9* | 7/2024 | Yuan | G02F 1/3517 |
| 2024/0289600 A1* | 8/2024 | Xiao | G02B 6/29343 |
| 2024/0311627 A1* | 9/2024 | Tossoun | G06N 3/048 |
| 2025/0068032 A1* | 2/2025 | Karabchevsky | G06N 3/048 |

OTHER PUBLICATIONS

D. Liang et al., "A Tunable Hybrid III-V-on-Si MOS Microring Resonator with Negligible Tuning Power Consumption," in Optical Fiber Communication Conference, OSA Technical Digest (online) (Optica Publishing Group, 2016), paper Th1K.4, 3 pages. (Year: 2016).*
Y. Zuo et al., "All-optical neural network with nonlinear activation functions," Optica 6, 1132-1137 (2019), 6 pages. (Year: 2019).*
C. Huang et al., "On-Chip Programmable Nonlinear Optical Signal Processor and Its Applications," IEEE Journal of Selected Topics in Quantum Electronics 27(2), 1-11 (Mar.-Apr. 2021) doi:10.1109/JSTQE.2020.2998073, 11 pages. (Year: 2021).*
"Artificial Neural Network Market Research Report by Component, Organization Size, Application, Deployment Mode, Industry Vertical, Region—Global Forecast to 2027—Cumulative Impact of COVID-19", available online at <https://www.yahoo.com/now/artificial-neural-network-market-research-131800726.html>, Apr. 22, 2022, 10 pages.
Batta Mahesh, "Machine Learning Algorithms—A Review", International Journal of Science and Research (IJSR), 2018, 7 pages.
Belt et al., "Ultra-low-loss Ta 2 O 5-core/SiO 2-clad planar waveguides on Si substrates", vol. 4, No. 5, May 2017, pp. 532-536.
Cheung et al., "Comparison of Al2O3 and HfO2 MOSCAP III-V/Si Power Splitters and (De-) Interleavers for DWDM Optical Links", Optica Publishing Group, 2022, 3 pages.
Chiu et al., "Nonlinear and low-loss tantalum pentoxide based micro-ring resonator by ion-assisted electron-beam deposition", vol. 3, No. 12, 2020, 12 pages.
Christian et al., "Low-loss plasmon-assisted electro-optic modulator", ETH Library, 2018, 12 pages.
Du et al., "On the Power of Over-parametrization in Neural Networks with Quadratic Activation", In International conference on machine learning, 2018, pp. 1329-1338.
Fard et al., "Experimental realization of arbitrary activation functions for optical neural networks", vol. 28, No. 8, Apr. 13, 2020, 11 pages.
Fathpour et al., "Heterogeneous Nonlinear Integrated Photonics", IEEE Journal of Quantum Electronics, vol. 54, No. 6, Dec. 2018, pp. 6300716-6300716.
Feldmann et al., "All-optical spiking neurosynaptic networks with self-learning capabilities", Nature 569, No. 7755, Feb. 2021, 26 pages.
Jean et al., "Universal micro-trench resonators for monolithic integration with silicon waveguides", vol. 11, No. 9, Sep. 1, 2021, pp. 2753-2767.
Jha et al., "Programmable, high-speed all-optical nonlinear activation functions for neuromorphic photonics", IEEE, 2021, 3 pages.
Jha et al., "Reconfigurable all-optical nonlinear activation functions for neuromorphic photonics", vol. 45, No. 17, Sep. 2020, 4 pages.
Jung et al., "Tantala Kerr nonlinear integrated photonics", vol. 8, No. 6, Jun. 2021, pp. 811-817.
Kiani, F., et al., "A fully hardware-based memristive multilayer neural network", Nov. 24, 2021, 10 pages.
Kurczveil et al., "Hybrid Silicon Quantum Dot Comb Laser with Record Wide Comb Width", Frontiers in Optics / Laser Science, 2020, 2 pages.
Miscuglio et al., "All-optical nonlinear activation function for photonic neural networks [Invited]", vol. 8, No. 12, Dec. 1, 2018, 13 pages.
Miscuglio et al., "Roadmap on Material-Function Mapping for PhotonicElectronic Hybrid Neural Networks", Oct. 10, 2019; 22 pages.
Nahmias et al., "A Leaky Integrate-and-Fire Laser Neuron for Ultrafast Cognitive Computing", IEEE Journal of Selected Topics in Quantum Electronics, vol. 19, No. 5, Sep./Oct. 2013, pp. 1800212-1800212.
Pérez et al., "Multipurpose silicon photonics signal processor core", Nature Communications, 2017, 10 pages.
Pu et al., "Ultra-Efficient and Broadband Nonlinear AlGaAs-on-Insulator Chip for Low-Power Optical Signal Processing", DTU, Jul. 28, 2022, 34 pages.
Shastri et al., "Principles of Neuromorphic Photonics", 2017, 28 pages.
Tait et al., "A silicon photonic modulator neuron", Physical Review Applied 11, No. 6, 2019, 16 pages.
Totovic et al., "Femtojoule per MAC Neuromorphic Photonics: An Energy and Technology Roadmap", 2019, 17 pages.
Williamson et al., "Reprogrammable Electro-Optic Nonlinear Activation Functions for Optical Neural Networks", IEEE, 2019, 12 pages.
Woods et al., "Supercontinuum generation in tantalum pentoxide waveguides for pump wavelengths in the 900 nm to 1500 nm spectral region", vol. 28, No. 21, Optics Express, 2020, 12 pages.
Wu et al., "Low-threshold all-optical nonlinear activation function based on a Ge/Si hybrid structure in a microring resonator", Optical Materials Express 12, No. 3, 2022, 11 pages.
Xie et al., "Silicon-integrated nonlinear III-V photonics", vol. 10, No. 2, Feb. 2022, pp. 535-541.

* cited by examiner

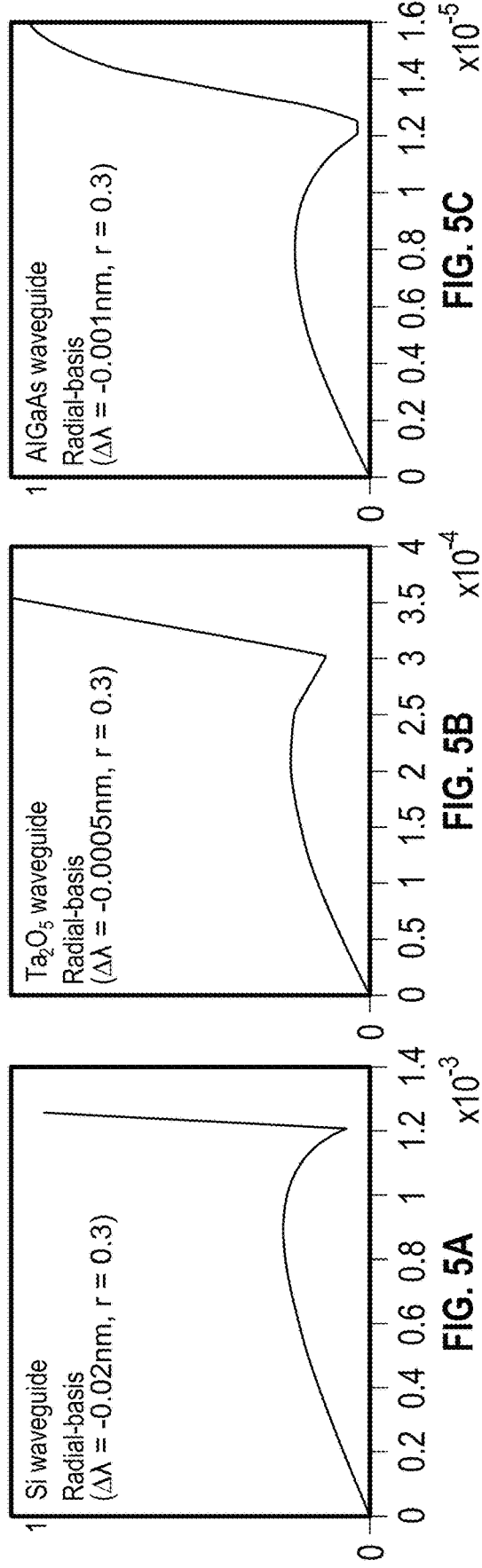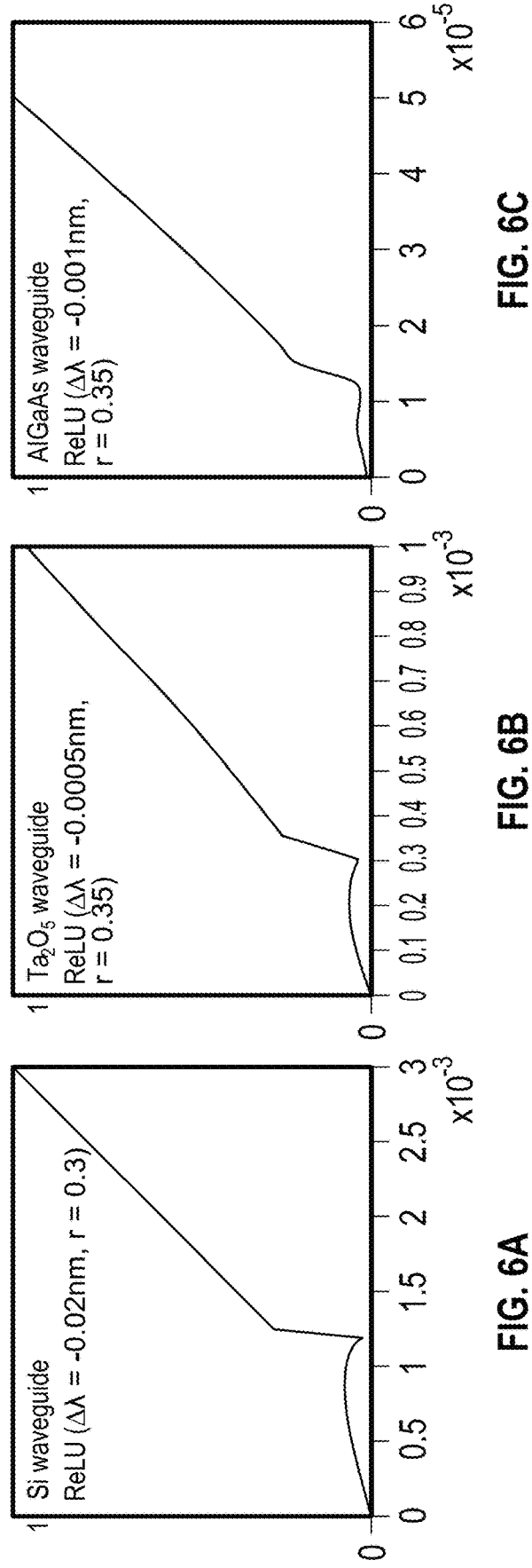

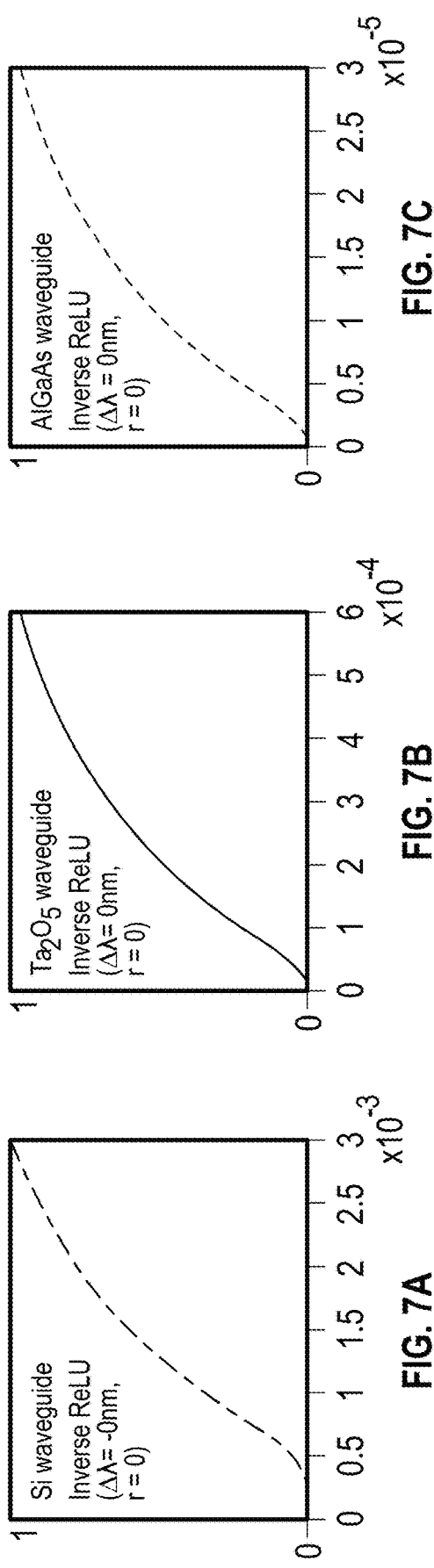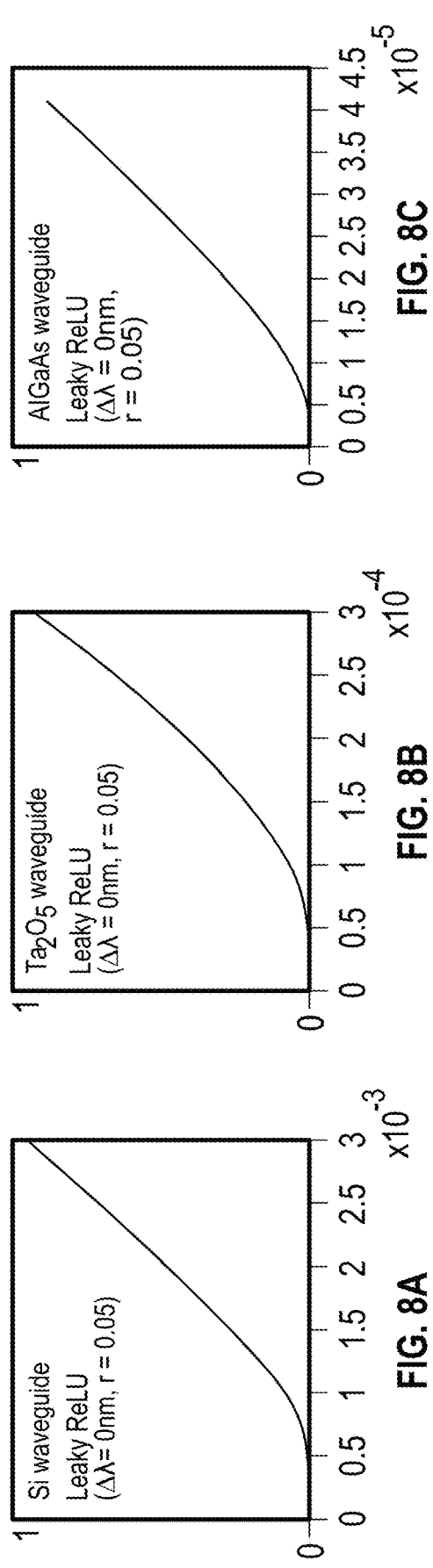

RECONFIGURABLE ALL-OPTICAL NONLINEAR ACTIVATION FUNCTIONS ON SILICON-INTEGRATED PLATFORM

BACKGROUND

Driven by growing interest in artificial intelligence (AI), the global artificial neural network market is projected to grow at a significant rate. Artificial neural networks (ANN) and learning algorithms have the ability to learn from large data sets, which can create a machine having human-like decision making capabilities with low latency and high energy efficiency. Compared to the electronics system, neuromorphic photonics demonstrate improved performance in terms of multiplexing, energy dissipation and crosstalk, which are beneficial for dense and high-bandwidth interconnects. Consequently, the neuromorphic photonic systems potentially offer operating speeds that are several orders of magnitude faster than neuromorphic electronics, along with higher efficiency. ANN are computing systems inspired by biological neural networks, and consist of a collection of connected nodes or neurons. A neuron includes of linear weighting, summation and a nonlinear activation, which is a building block in the ANN and can achieve complex mappings between inputs and outputs for learning tasks. Several nonlinear functions, such as sigmoid, radial-basis, rectified linear unit (ReLU), and quadratic functions to name a few examples, are widely used in ANNs for different machine learning tasks.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIGS. 5A-9C depict graphical representations of various normalized nonlinear activation functions as a function of input optical power in accordance with implementations disclosed herein.

Figure 1:
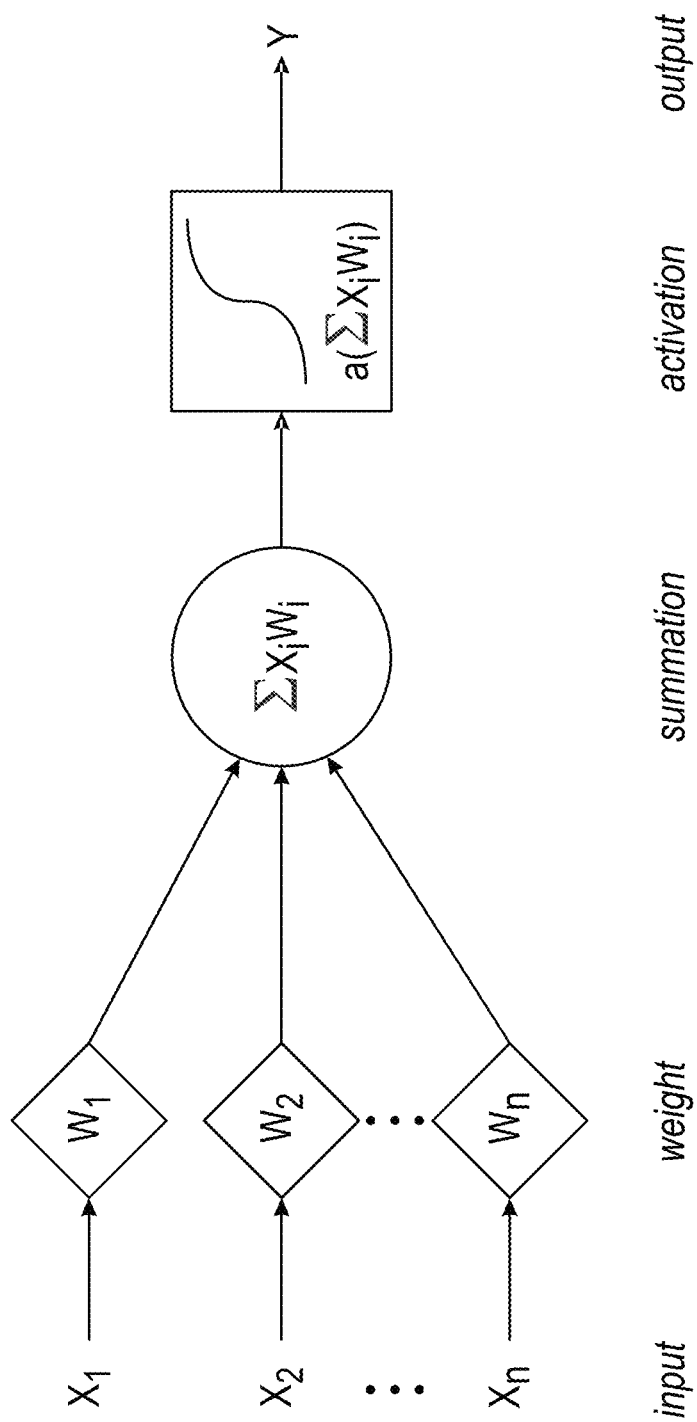
FIG. 1 illustrates a model of an example nonlinear neuron, which includes synapses, weighted addition and a nonlinear activation function in accordance with implementations disclosed herein.

The figures are not exhaustive and do not limit the present disclosure to the precise form disclosed.

DETAILED DESCRIPTION

As described above, ANNs and machine learning algorithms have the ability to learn from large data sets to create a human-like machines. A neuron of an ANN consists of linear weighting of inputs, summation and a nonlinear activation that achieves complex mappings between inputs and outputs for learning. Example nonlinear activation functions include, but are not limited to, sigmoid, radial-basis, ReLU (such as ReLU, inverse ReLU, and leaky ReLU), and quadratic functions, each of which are used in signal processing for different machine learning tasks. The various nonlinear activation functions are suitable for different tasks in neural networks and machine learning applications. For example, ReLU functions can provide for solving nonlinear optimization problems with constraints, and can be used in feedforward machine learning networks, such as multi-layer perceptron and convolutional neural networks. Other examples include, radial-basis functions used for multilayers based on support vector machines and quadratic functions used to simulate higher-order polynomial neural networks.

With the development of nonlinear optics, some all-optical methods of implementing activation functions have been proposed. However, the optical nonlinearities are relatively weak, and thus all optical activation devices generally require high threshold power and large optical injection (e.g., input optical signal into the device). Another technical short coming of conventional all-optical methods is that the activations devices are generally fixed following fabrication, and therefore are not configurable to achieve different activation functions. That is, the conventional activation devices are generally fabricated for a single activation function, and cannot be switched (e.g., configured) for a different activation function.

In order to achieve nonlinear activation functions, various approaches have been applied. Generally, these approaches can be divided into two types—an optoelectronic approach and an all-optical approach. In optoelectronic approaches, nonlinear schemes integrated with photodetectors have been demonstrated based on a silicon microring modulator, a Mach-Zehnder modulator (MZM), electro-absorption modulator, or laser. However, these optoelectronic approaches are all subject to technical shortcomings, for example, all these approaches require efficient and fast optic-electro-optic conversion. These requirements almost always lead to increased system complexity and additional power consumption from electronic devices, such as complementary metal-oxide-semiconductor (CMOS) field effect transistors.

Thus, all-optical approaches have attracted increasing attention. Some implementations use a microring resonator (MRR) combined with phase change material (PCM) to change transmission versus power and realize the nonlinear activation function. However, the speed is limited due to the constraints in the PCM. A germanium/silicon (Ge/Si) hybrid microring structure has been used to generate an activation function based on the strong thermal-optic effect of germanium; however, the thermal process remains slow. An all-optical scheme on a silicon photonic platform has been demonstrated, which uses a cavity-loaded Mach-Zehnder interferometer (MZI) device utilizing the free-carrier dispersion (FCD) effect of Si to provide for nonlinearity. However, two-photon absorption (TPA) induced free carriers result in detrimental power and speed limitations for realizing certain activation functions. A modified version of the cavity-loaded MZI using a $Si_3N_4$ platform is still limited by the weak Kerr effect of $Si_3N_4$.

Accordingly, implementations disclosed herein provides for devices and methods for all-optical reconfigurable activation functions that overcome shortcomings of prior approaches. The implementations disclosed herein utilize a silicon-on-insulator (SOI) platform, which is heterogeneous, integrated with highly nonlinear and low-loss materials having high Kerr effects and large bandgaps, to generate configurable all-optical nonlinear activation functions. Various implementations provide for a resonating cavity constructed using ultra-low lass materials having high Kerr effects and/or large bandgaps to enhance the nonlinearity of the activation. In an example implementation, aluminum gallium arsenide (AlGaAs), which has a strong Kerr effect, can be used to form a resonating cavity. In another example implementation, tantalum pentoxide ($Ta_2O_5$) may be used, which similar has a strong Kerr effect. The Kerr effect, also called the quadratic electro-optic (QEO) effect, is a change in refractive index of a material in response to an applied electric field (such as irradiance by a light source in the case of an optical Kerr effect).

According to example implementations disclosed herein, an all-optical reconfigurable activation device comprises a structure having a Mach-Zehnder coupler (MZC) and a resonating cavity-loaded Mach-Zehnder interferometer (MZI). According to various implementations, the resonator cavity is implemented as a microring resonator (MRR). The nonlinearity is provided by the resonating cavity, which changes the phase and amplitude of the transmission. The MZI converts a nonlinear phase to a nonlinear response. The phase of MZI can be adjusted by a phase-shift mechanism. The MZC acts as a tunable directional coupler, which is controlled by a phase-shift mechanism optically coupled to a branch of the MZC. The various phase-shift mechanism provides for the programmability of the nonlinear function shape through tuning of relative phase differences within the structure, which may be provided as any mechanism capable of inducing a phase shift in an optical signal propagating through the respective waveguide. For example, a resonance wavelength of the resonating structure can be tuned/detuned and coupling coefficient tuned/detuned, to switch (e.g., reconfigure) between various activation functions, such as sigmoid, radial-basis, ReLU (e.g., ReLU, inverse ReLU, and leaky ReLU), and quadratic functions for different task applications.

In an example implementation, a cavity-loaded MZI comprises a first waveguide formed of a first material coupled to a second waveguide formed of a second material. The second waveguide comprises an input end and an output end, where the input end of the second waveguide is coupled to an output end of the first waveguide and the output end of the second waveguide is coupled to an input end of the first waveguide. In some implementations, to optimize mode transfer between the first and second waveguides, an optical signal propagating in the first waveguide is evanescently coupled into the second waveguide though a first pair of inverse tapers (e.g., each of the first and second waveguide taper in inverse direction relative to each other). Similarly, an optical signal propagating in the second waveguide is evanescently coupled into the first waveguide though a second pair of inverse tapers. The first and second waveguides may form a branch of the MZI. A resonating cavity, formed of the second material, is evanescently coupled to the second waveguide.

According to the implementations disclosed herein, the second material is provided as a low-loss material having a high Kerr effect and large bandgaps, to generate configurable all-optical nonlinear activation functions. For example, the second material may be AlGaAs having a nonlinear refractive index of $2.6 \times 10^{-17}$ $m^2/W$ and a bandgap of 1.92 eV. In another example, the second material may be $Ta_2O_5$ having a nonlinear refractive index of $7.2 \times 10^{-19}$ $m^2/W$ and a bandgap of 3.8 eV. The first material according to various implementations may be silicon or another Group VI material. Note that the nonlinear refractive index of silicon is $4.5 \times 10^{-18}$ $m^2/W$ and the bandgap is 1.12 eV.

The high Kerr effect of the second material permits optical injection power to be much lower than other all-optical platforms, such as those relying on the FCD of Si to provide nonlinear activation. The first material also comprises a high-power intensity-induced thermal effect that is negligible. In addition, two-photon absorption (TPA) and induced free-carrier dispersion (FCD) does not exist due to the large bandgap, which removes speed limitations from carrier lifetime. For the first material, FCD is in conflict to Kerr effect due to the existence of free carriers generated by TPA. For example, in the case of Si, FCD and Kerr effect in Si will push the resonance frequency in opposite directions. However, FCD usually dominates over Kerr effect, and as a result, in the case of Si, the Kerr effect can decrease the overall nonlinearity. The second material according to the implementations disclosed here can function to remove this conflict.

It should be noted that the terms "optimize," "optimal", and the like as used herein can be used to mean making or achieving performance as effective, perfect, or improved as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

As used herein "approximately" and "generally" refer to permissible variations in properties of the implementations disclosed herein. Implementations disclosed herein may have certain properties, attributes, and/or characteristics that include some acceptable variation that does not significantly affect the functioning of the disclosed implementations.

FIG. 1 illustrates an example neuron of an ANN, where the inputs (e.g., $X_1$ to $X_n$) into the neuron is a linear combination (weighted addition) of the output of other neurons. This neuron applies weights (e.g., $W_1$ to $W_n$) to the input signals and aggregates (e.g., summation) weighted signals over time and produces a nonlinear response Y, which is represented by an activation function. The neuron's output is then broadcast to successive neurons in the ANN. Note that the inter-neuron connections can be weighted with positive and negative values represented as excitatory and inhibitory synapses, respectively. The synaptic interconnection network of neurons can be represented as a matrix of the weight values ($w_{ij}$) or real numbers. Moreover, the coding scheme will map the real-valued weights and represent them as spiking signals.

Figure 2:
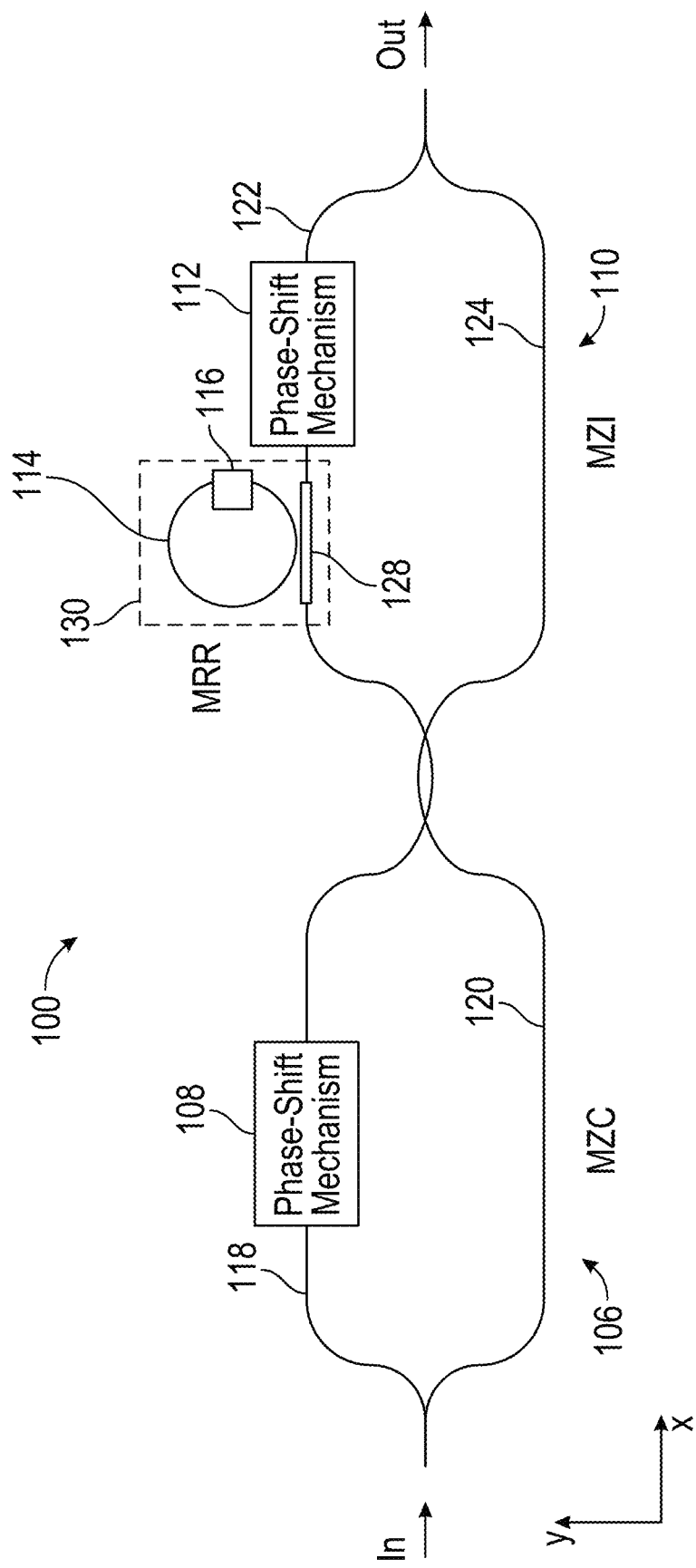
FIG. 2 depicts a schematic diagram of an all-optical nonlinear activation device in accordance with implementations disclosed herein.

FIG. 2 depicts a schematic diagram of an all-optical nonlinear activation device 100 in accordance with implementations disclosed herein. The activation device 100 includes an input end to receive an input optical signal and an output end to transmit an output optical signal, respectively. Activation 100 comprises a Mach-Zehnder Coupler (MZC) 106 that receives the input optical signal and is optically coupled to a Mach-Zehnder Interferometer (MZI) 110 that outputs the output optical signal. The MZC 106 comprises branch 118 and branch 120, each of which may be implemented as waveguides to guide propagation of light (e.g., an optical signal such as a lasing mode). The MZC 106 includes a first phase-shift mechanism 108 in one of branches 118 and 120. In the illustrative example shown in FIG. 2, the first phase-shift mechanism 108 is provided along branch 118; however, the first phase-shift mechanism 108 may be provided along either branch 118 or branch 120. The MZI 110 comprises branch 122 and branch 124, each of which may be implemented as waveguides to guide propagation of light (e.g., an optical signal such as a lasing mode). The MZI 110 also includes a second phase-shift mechanism 112 and at least one MRR 114, each of which is optically coupled to one of branch 122 and branch 124 of the MZI 110. The second phase-shift mechanism 112 and MRR 114 may be optically coupled along the same (or common) branch of the MZI 110. In the illustrative example, the second phase-shift mechanism 112 and MRR 114 are provided along branch 122; however, the second phase-shift mechanism 112 may be provided along wither of branch 122 or branch 124. Additional MRRs may be included in the other branch, or multiple MRRs may be included on one branch, depending on the implementation. The MRR 114, in some implementations, may include a third phase-shift mechanism 116.

The phase-shift mechanisms 108, 112, 116 are configured to alter a phase of an optical signal propagating therein. Phase-shift mechanism 108, 112, and 116 may be provided as any mechanism capable of inducing a phase shift in light propagating through a respective waveguide (particular examples of phase-shift mechanism are provided below in greater detail). In the illustrative example of FIG. 2, first phase-shift mechanism 108 can be controlled to tune a relative phase difference between branch 118 and branch 120 of MZC 106 by inducing a phase shift in branch 118. Second phase-shift mechanism 112 can be controlled to tune a relative phase difference between branch 122 and branch 124 of MZI 110 by inducing a phase shift in branch 122. Third phase-shift mechanism 116 can be controlled to tune a resonance frequency of the MRR 114 by inducing a phase shift in a resonance cavity (e.g., waveguide) of the MRR 114. By tuning relative phase differences within the activation device 100, the phase-shift mechanisms 108, 112, and/or 116 function as tunable elements configured to efficiently change a biases of the activation device 100, which enables the device 100 to be programmed to achieve desirable activation functions for different applications (as described below in connection with FIGS. 5A-9C). For example, tuning one or more of the phase-shift mechanisms 108, 112, and/or 116 provides for switching between different activation functions. Thus controlled tuning of phase-shift mechanisms 108, 112, and/or 116 provides for configuring the activation device into a desired activation function, which can be changed at a later time by controlling phase-shift mechanisms 108, 112, and/or 116. The activation device 100 can achieve these functions with high accuracy because the tunable elements can be precisely controlled by an automated control system (e.g., implemented as computer system 1200 of FIG. 12).

According to various implementations, the MZC 106 functions as a tunable directional coupler based on tuning of the phase-shift mechanisms 108. For example, tuning the relative phase difference between branch 118 and branch 120 of MZC 106 via phase-shift mechanisms 108 provides for tuning of a splitting ratio (r) of optical power supplied to each branch of MZI 110. That is, the ratio of optical power supplied to branch 122 over the optical power supplied to branch 122 of MZI 110 can be controlled by tuning the phase difference between the optical signal in branch 118 and the optical signal in branch 120 via phase-shift mechanisms 108. For example, when the splitting ratio (r) is one, all the optical power from the MZC 106 (e.g., optical power in both branch 118 and branch 120) is supplied to branch 124. A splitting ratio of one can be achieved tuning the relative phase difference between branch 118 and branch 120 of MZC 106 to 270° (e.g., 3π/2 radians). Alternatively, when the splitting ratio (r) is zero, all the optical power from the MZC 106 (e.g., optical power in both branch 118 and branch 120) is supplied to branch 122. A splitting ratio of zero can be achieved tuning the relative phase difference between branch 118 and branch 120 of MZC 106 to 90° (e.g., π/2 radians). Thus, phase-shift mechanisms 108 can be controlled to tune the relative amplitude of optical power supplied to branch 122 and branch 124 of MZI 110.

In the MRR 114, when an optical signal therein is near the resonance frequency, the optical signal experiences a power-dependent nonlinear phase shift that varies rapidly with its optical power. In addition, the MRR 114 can also increase the effective interaction length and instantaneous optical power through coherent power buildup, therefore reducing the required optical power supply. Phase-shift mechanisms 116 can be controlled to tune the resonance frequency. The MZI 110 is used to convert the phase change from the MRR 114 into an intensity change with a large extinction ratio. With a sufficiently large phase difference, interference between optical signals propagating in the two branches of the MZI 110 can switch from constructive to destructive, leading to self-switching. Accordingly, loading at least one branch of the MZI 110 with an MRR 114, as shown in FIG. 2, provides for configurability between different activation functions by the all-optical nonlinear activation device 100. Additional MRRs may be provided to support and/or assist with this switching effect. Thus, while multiple MRRs are possible, at least one branch is loaded with at least MRR to achieve the desired effects.

To maximize the switching effect, a low power signal can be switched off through destructive interference. Ideal destructive interference requires signals traveling in the two branches of the MZI 110 to have equal amplitudes and an exact rr phase difference. As noted above, the MZC 106, which precedes the MRR-assisted MZI 110, functions as a tunable a directional coupler configured to tune the amplitudes of the optical power supplied to each branch of MZI 110 via phase-shift mechanisms 108. The bias of the MZC 106 (through the phase-shift mechanism 108) can be adjusted to balance the amplitudes at the two branches of the MZI 110, while the MZI 110 bias can be independently tuned to introduce a π phase difference to achieve destructive interference. The bias on the MRR 114 also can be adjusted to ensure that the activation device 100 is operating approximately at the resonance wavelength to achieve the optimal sensitivity (e.g., highest possible sensitivity).

The dynamic response of the activation device 100 can be simulated based on rate equations and coupled-mode theory as set forth below. The dynamic equations can be simplified with amplitude of the optical signal in the MRR 114 (e.g., change of amplitude over time calculated as da/dt) and free carrier (FC) density N (e.g., change in FC density over time calculated as dN/dt):

$$\frac{da}{dt} = -\left(-j\frac{2\pi c}{\lambda^2}\Delta\lambda + \gamma_L\right)a - j\eta_k|a|^2 a - j\eta_{fc}Na - j\mu\sqrt{P_{in}} \quad \text{Eq. 1}$$

$$\frac{dN}{dt} + \frac{N}{\tau_{fc}} = \zeta|a|^4 \quad \text{Eq. 2}$$

where j represents an imaginary value; Δ represents a wavelength of an input optical signal (e.g., 1310 nm in some examples); Δλ represents detuning of the wavelength of the input optical signal from the resonant frequency of the MRR 114; c is the speed of light; $\gamma_L$, μ, $P_{in}$, and $\tau_{fc}$ represents linear decay rate, energy coupling coefficient for MRR 114 (for example, 33000 in the case of AlGaAs), input power, and free carrier lifetime (e.g., 0.5 ns in some examples), respectively; $\eta_k$, $\eta_{fc}$ and ξ relate to the Kerr effect coefficient, free carrier dispersion (FCD) effect coefficient, and two-photon absorption (TPA) coefficient, respectively; a represents a field amplitude in the MRR 114; $|\alpha|^2$ represents the power in the MRR 114; N represents the free carrier density in the MRR 114. In Eq. 1, $$\left(-j\frac{2\pi c}{\lambda^2}\Delta\lambda + \gamma_L\right)$$

a represents a linear effect and $j\eta_k|\alpha|^2\alpha - j\eta_{fc}Na$ represents a nonlinear effect.

The linear decay rate ($\gamma_L$), input power ($P_{in}$), Kerr effect coefficient ($\eta_k$), FCD effect coefficient ($\eta_{fc}$), and free carrier generation coefficient (ξ) are determined as follows:

$$P_{out} = |\sqrt{P_{in}} - j\mu a|^2 \quad \text{Eq. 3}$$

$$\gamma_L = \frac{v_g\alpha_0}{2} + \frac{\mu^2}{2} \quad \text{Eq. 4}$$

$$\eta_k = \left(\frac{n_c}{n_r}\right)^2 (n_2 k_0 - \frac{j\alpha_2}{2})\frac{v_g}{A_{eff}T_{rt}} \quad \text{Eq. 5}$$

$$\eta_{fc} = \frac{n_c}{n_r}\left(\sigma_r k_0 - \frac{j\sigma_a}{2}\right)v_g \quad \text{Eq. 6}$$

$$\xi = \left(\frac{n_c}{n_r}\right)^2 \frac{\alpha_2}{2\hbar\omega A_{eff}^2 T_{rt}^2} \quad \text{Eq. 7}$$

where $v_g$ represents group velocity (for example, approximately $7.9\times10^7$ m/s in the case of AlGaAs); $\alpha_0$ represents the linear loss coefficient; $T_{rt}$ represents the round trip time in microring (e.g., 9.56 ps in the case of AlGaAs); $n_c$ represents the core refractive index; $n_r$ mode effective index; $n_2$ represents the nonlinear refractive index; $\alpha_2$ represents the two photon absorption (TPA) coefficient (for example, in the case of low loss and large bandgap materials this coefficient is approximately 0); $A_{eff}$ represents the effect mode area (for example, 0.15 um$^2$); $k_0$ represents the wavenumber; $\sigma_r$ represents the free carrier refraction volume (for example, $-5.3\times10^{27}$ m$^3$); $\sigma_a$ represents the free carrier absorption cross section ($1.5\times10^{21}$ m$^2$).

According to Eqs. 1 and 2, intensity-dependent nonlinearity arises from the Kerr effect, FCD, and/or TPA. For example, as shown in Eq. 1, the nonlinear effect includes a first portion dependent on the Kerr effect coefficient ($\alpha_k$) and a second portion dependent on the FCD effect coefficient ($\eta_{fc}$) and the FC density (N), which is dependent on the free carrier generation coefficient (ξ) as shown in Eq. 1. The Kerr effect coefficient ($\eta_k$) is proportional to the nonlinear refractive index ($n_2$) and the TPA coefficient (ξ) is proportional to the two photon absorption coefficient ($\alpha_2$). The resonance frequency of MRR 114 redshifts (e.g., decreases in frequency and photon energy while increasing in wavelength) when the Kerr effect dominates because $n_2>0$, while the FCD effect is in opposite direction because the FC volume is negative.

Table 1 below provides various materials that may be implemented in the activation device 100. Table 1 provides, for each material, the core refractive index ($n_c$); the nonlinear refractive index ($n_2$), the linear loss coefficient ($\alpha_0$), and a ratio of the nonlinear refractive index ($n_2$) over the linear loss coefficient ($\alpha_0$).

TABLE 1

| material | $n_c$ | Bandgap (eV) | $n_2$ (m$^2$/W) | $\alpha_0$ (dB/m) | $n_2/\alpha_0$ |
|---|---|---|---|---|---|
| Si | 3.45 | 1.12 | $4.5 \times 10^{-18}$ | 200 | $2.25 \times 10^{-20}$ |
| InGaP | 3.1 | 1.9 | $4 \times 10^{-18}$ | 1000 | $4 \times 10^{-21}$ |
| AlN | 2.12 | 6 | $2.3 \times 10^{-19}$ | 50 | $4.6 \times 10^{-21}$ |
| Si$_3$N$_4$ | 2 | 5.1 | $2.4 \times 10^{-19}$ | 8 | $3 \times 10^{-20}$ |
| InGaAsP | 3.58 | 1.2 | $1 \times 10^{-17}$ | 300 | $3.33 \times 10^{-20}$ |
| GaAs | 3.4 | 1.42 | $2 \times 10^{-17}$ | 50 | $4 \times 10^{-20}$ |
| GaP | 3.05 | 2.24 | $6 \times 10^{-18}$ | 140 | $4.29 \times 10^{-20}$ |
| Ta$_2$O$_5$ | 2.06 | 3.8 | $7.2 \times 10^{-19}$ | 8 | $9 \times 10^{-20}$ |
| AlGaAs | 3.28 | 1.92 | $2.6 \times 10^{-17}$ | 60 | $4.33 \times 10^{-19}$ |

As noted above, conventional all-optical activation devices relied on the FCD effect of Si to provide for nonlinearity by using MRR formed of a Si waveguide. However, as can be derived from Eqs. 1-7, this nonlinearity effect is weak and input optical power needed to be very high to achieve certain activation functions. Furthermore, the FCD effect is in conflict to Kerr effect (e.g., FCD and Kerr effect push the resonance frequency in opposite directions) due to the existence of free carriers generated by TPA, and FCD usually dominates over the Kerr effect. A MRR formed of a Si$_3$N$_4$ waveguide is still limited by the weak Kerr effect of Si$_3$N$_4$.

Accordingly, activation device 100, according to implementations disclosed herein, comprises a MZC 106 and MZI 110 having branches comprising waveguides formed of a first material and a MRR 114 comprising a waveguide formed of a second material dissimilar to the first material. The first material may be silicon or another Group IV material (e.g., germanium, silicon carbide, silicon germanium, and so on). The second material is a low loss material having a high Kerr effect and low FCD and/or TPA effects. The second material is selected from materials having a bandgap that is more than twice of the working wavelength (e.g., 1.31 μm to 0.95 eV). As a result of this property, the TPA effect is negligible. Materials with negligible TPA may generally also have a low linear loss coefficient ($\alpha_0$). However due to fabrication, process or other integration issues into the SOI platform, the linear loss coefficients of the respective materials change as shown in Table 1. Materials with a narrow bandgap (e.g., such as Si) will result in free carrier generation. Therefore, the carrier induced thermal problems under high optical power cannot be ignored for these narrow bandgap materials, and as a result the waveguide cannot support a high-power optical signal. The free-carrier effect is a slow process (<GHz) and leads to a limitation on processing speed due to the lifetime of free carriers. Kerr effect is a fast process (easy to achieve over 10 GHz) and data speed can be improved. As noted above, the FCD effect is opposite to Kerr effect, but if there are no free carriers the contrast can be avoided. Accordingly, implementations disclosed herein provide for a second material that is selected from materials having a bandgap that is at least larger than 1.12 eV, and, more preferably, larger than 1.9 eV. According, as used herein, a wide or large bandgap refers to a bandgap that is at least larger than 1.12 ev.

From the materials having the desired bandgap, according to various implementations, the second material can be selected as a material having at least one of: a high nonlinear refractive index ($n_2$) and a low linear loss coefficient ($\alpha_0$). For example, implementations disclosed herein provide for a second material having at least one of: (i) a nonlinear refractive index ($n_2$) that is higher than that of a silicon waveguide and (ii) a linear loss coefficient ($\alpha_0$) that is lower than that of a silicon waveguide. As used herein, a high nonlinear refractive index ($n_2$) means nonlinearity due to the Kerr effect is strong and the required input optical power is low. For example, a high nonlinear refractive index ($n_2$) (e.g., strong Kerr effect) refers to a material having a nonlinear refractive index ($n_2$) that is larger than $2.4 \times 10^{-19}$ m$^2$/W, and very high nonlinear refractive index ($n_2$) (e.g., very strong Kerr effect) refers to a material having a nonlinear refractive index ($n_2$) that is larger than $4.5 \times 10^{-18}$ m$^2$/W. As used herein, low linear loss coefficient ($\alpha_0$) means the quality factor for the MRR 114 is high and the optical power in the MRR 114 is enhanced. For example, a low linear loss coefficient ($\alpha_0$) refers to a linear loss coefficient ($\alpha_0$) that is lower than 200 dB/m, such that the quality factor for the MRR 114 is higher than that of an MRR formed of Si and the optical power in the MRR 114 is enhanced relative to an MRR formed for Si. In addition, the TPA for low loss materials is negligible and thus thermal induced shifts can be ignored. Accordingly, implementations disclosed herein can support high input power optical signals. The FCD from TPA, which leads to a limitation on processing speed due to the lifetime of free carriers, is also negligible and operating speed can be improved.

In some implementations, the second material may be selected based on both of the nonlinear refractive index ($n_2$) and the linear loss coefficient ($\alpha_0$) so to provide a nonlinear effect that is dependent on the Kerr effect, while the TPA and FCD effects are negligible. For example, as noted above, the TPA effect dominate and control the nonlinearity effects, and the FCD effect leads to a speed limitation. Accordingly, some implementations disclosed use a second material having a wide bandgap (e.g., more than 1.12 eV and, more preferably, more than 1.9 eV) to avoid two photon absorption at 1310 nm. In addition, the second material has a ratio $n_2/\alpha_0$ that is larger than that of Si. More particularly, the ratio $n_2/\alpha_0$ may be larger than $5 \times 10^{-20}$. IN some implementations, the ratio $n_2/\alpha_0$ of the second material is at least $9 \times 10^{-20}$, for example, in the case of Ta$_2$O$_5$ and AlGaAs. Non-limiting examples of activation device 100 implemented with a MRR 114 comprising waveguides formed of Ta$_2$O$_5$ and AlGaAs are provided below in connection with FIGS. 3A-3C and 4A-4D, respectively.

Returning to FIG. 2, an optical signal propagating along the branch 122 of the MZI 110 can be evanescently couple light into the MRR 114 based on a coupling coefficient between the waveguide of branch 122 and the waveguide of MRR 114. The coupling efficient can be affected by differences in waveguide materials between the branch 122 and the MRR 114. As described above, each branch of the MZC 106 and MZI 110 comprise waveguides formed of a first material (e.g., silicon or another Group IV material) and the MRR 114 is formed of closed loop waveguide formed of a second material, which is a low-loss material having a high Kerr effect and large bandgaps. However, due to the differences in material properties, a large phase difference can exist between the waveguide of branch 122 and MRR 114.

To achieve sufficient coupling coefficient for MRR critical coupling, a second waveguide 128 can be included in branch 122 configured to facilitate optimal mode transfer from the branch 122 into MRR 114 and vice versa. Sufficient coupling coefficient for critical coupling condition as used herein refers to a coupling coefficient that is equal to loss per round in a microring. According to some implementations disclosed herein, a sufficient coupling coefficient may be <1%, depending on the material loss and length of the MRR 114. For example, the second waveguide 128 can be formed of the second material and coupled to a first waveguide formed of the first material at a position along branch 122 that is adjacent to the MRR 114. In some implementations (as will be described below in greater detail), to optimize the mode transfer between the first and second waveguides of branch 122, inverse taper pairs can be provided at the inputs/outputs of each waveguide (e.g., each of the first and second waveguides taper in inverse direction relative to each other). The MRR 114, formed of the second material, is evanescently coupled to the second waveguide 128. Thus, by optimizing the mode transfer between the first and second waveguides of branch 122, a sufficient coupling coefficient between the MRR 114 and the branch 122 can be achieved.

Figure 3A:
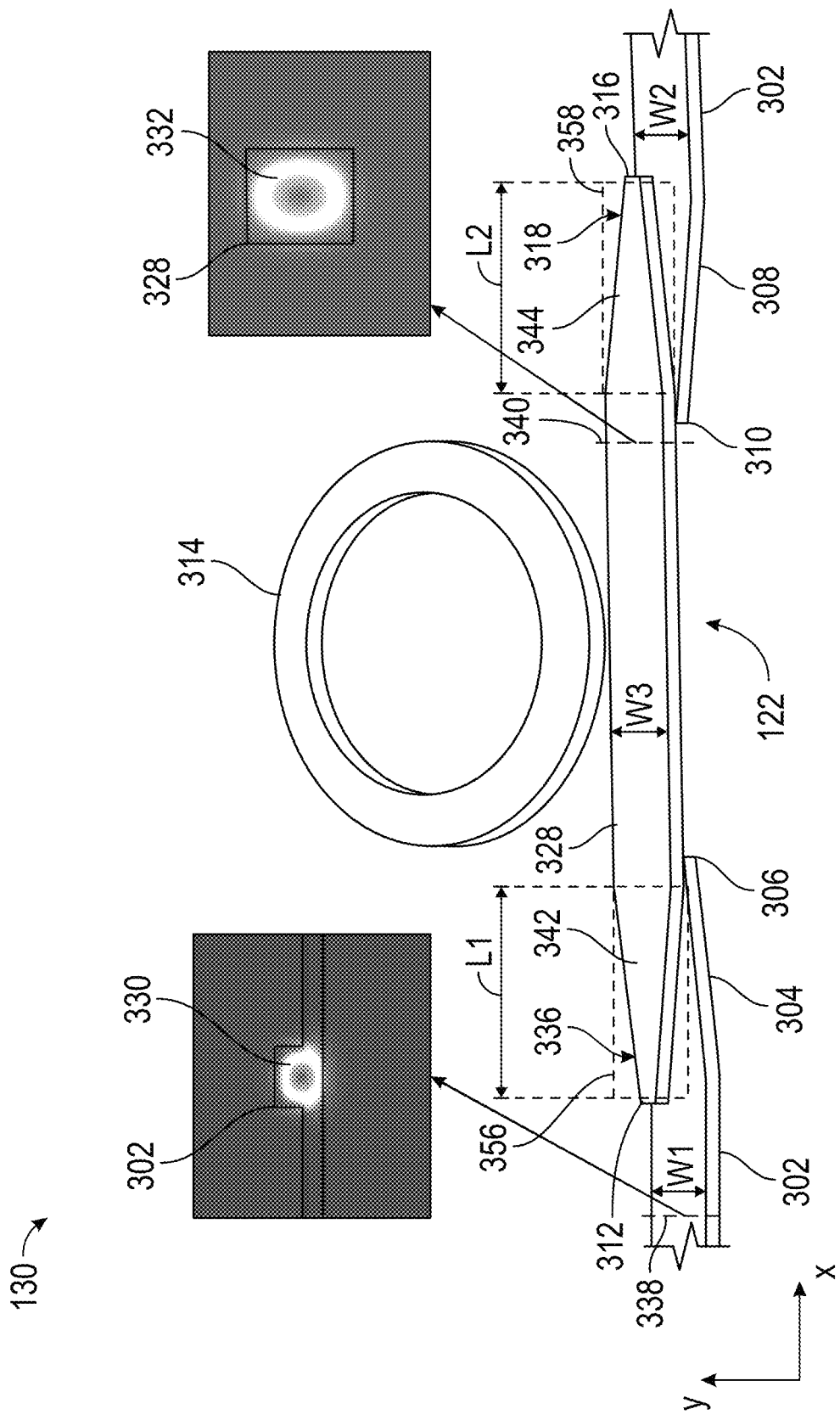
FIGS. 3A and 3B depict an example resonance cavity included in all-optical nonlinear activation device of FIG. 2 according to an example implementation.
Figure 3B:
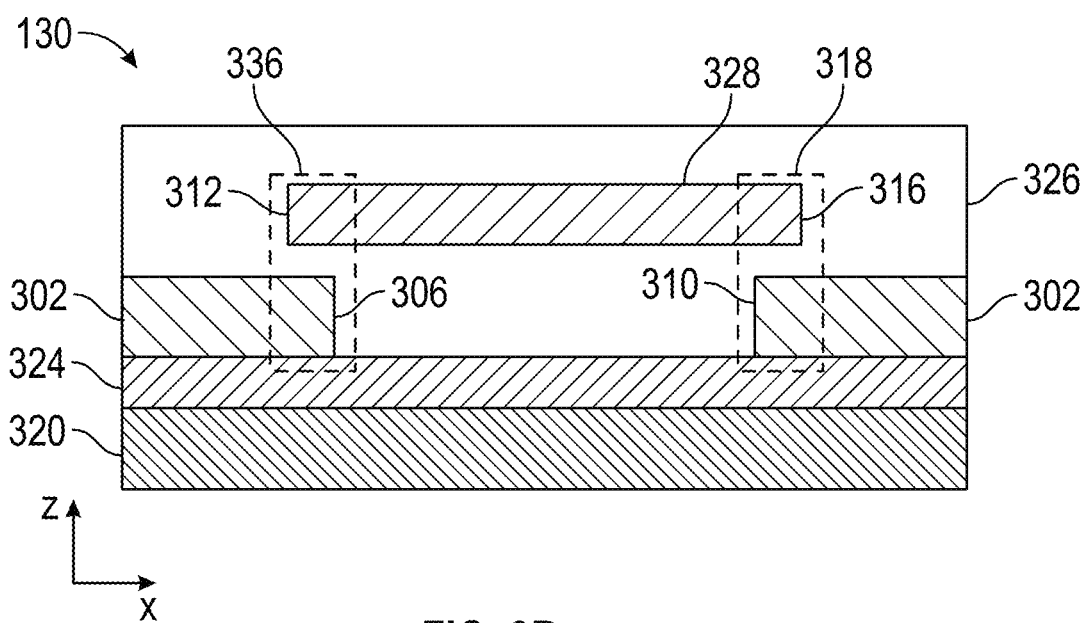

FIGS. 3A and 3B depict an example resonance cavity included in all-optical nonlinear activation device 100 according to an example implementation. Particularly, FIGS. 3A and 3B depict a zoomed-in perspective view of region 130 of FIG. 2 including a resonance cavity, for example MRR 314, coupled to branch 122 of the activation device 100. In the illustrative example of FIG. 3A, branch 122 of the MZI 110 includes first waveguide 302 evanescently coupled to second waveguide 328. The MRR 314 is evanescently coupled to the second waveguide 328. An optical signal propagating in the MZI 110 is evanescently coupled from first waveguide 302 into second waveguide 328, from second waveguide 328 into MRR 314, back into second waveguide 328, and then from second waveguide 328 into first waveguide 302. FIG. 3B depicts a side view of FIG. 3A viewed from a side opposite the MRR 314 along the branch 122.

As shown in FIGS. 3A and 3B, activation device 100 may have various widths and thicknesses. As used herein, "length" may be defined along an x-axis in FIGS. 3A and 3B, "width" may be defined along a y-axis of FIGS. 3A and 3B, and "height" or "thickness" may be defined along the z-axis of FIGS. 3A and 3B.

In the example shown in FIGS. 3A and 3B, the MRR 314 and second waveguide 328 are formed of Ta$_2$O$_5$ as the second material. In this illustrative example, second waveguide 328 and MRR 314 are formed on a SOI substrate 320 with a buried oxide (BOX) layer 324 formed thereon. To form the first waveguide 302, a first material (e.g., silicon or other Group IV material) is deposited on the BOX layer 324, which is patterned and etched. According to various implementations, the first material is silicon. While only region 130 is shown in FIGS. 3A and 3B, the MZC 106 and MZI 110 are formed using similar process, for example, the entire activation device 100 may be formed by providing a SOI substrate with a BOX layer formed thereon, followed by depositing the first material to form the MZC 106 and MZI 110 (e.g., waveguides making up the MZC 106 and MZI 110).

After pattern and etch of the waveguide structures of the MZI 110, hydrogen silsesquioxane (HSQ) planarization is performed. For example, HSQ planarization is realized by spin-coating the activation device 100 with a HSQ photoresist layer, which is followed by rapid thermal annealing to convert the HSQ photoresist layer to a silicon dioxide ($SiO_2$) layer 326. The $SiO_2$ layer 326 can be patterned and locally etched to a desired distance (e.g., height) from the first waveguide 302 waveguide. A tantala film can be deposited onto the etched layer 326 via sputtering. The tantala film according to various implementations can be a $Ta_2O_5$ film or coating. The tantala film can undergo thermal annealing, which relieves stress and reduces optical losses within the second waveguide 328. The desired distance between first waveguide 302 and second waveguide 328 along the stacking direction (e.g., z-axis in the context of FIG. 3B) can be selected to achieve a desired coupling coefficient between an upper most surface of the first waveguide 302 and bottom most surface of the second waveguide 328. For example, the distance therebetween may be selected to optimize the coupling coefficient.

In an illustrative example, the activation device 100 includes fully-etched, 500 nm-wide silicon waveguides (e.g., the MZC 106 and MZI 110 including first waveguide 302) on a passive-SOI platform with a material thickness of 220 nm and a 1 μm wide $Ta_2O_5$ waveguide (e.g., MRR 314 and second waveguide 328) with a material thickness of 1 μm. The BOX layer 324 can be a 3 μm thick oxide passivation layer. The MRR 314 can have a radius of 20 μm and the power coupling coefficient is approximately 0.4%, having a gap of approximately 340 nm between the second waveguide 328 and the MRR 314, yielding a Q-factor of about 160000. The distance in the z-axis direction between the first waveguide 302 and the second waveguide 328 is approximately 100 nm, which may provide for a coupling coefficient of over 97% While not shown in FIGS. 3A and 3B, the MRR 314 may be coupled to phase-shift mechanisms 116.

FIG. 3A depicts images of fundamental transverse (TE) modes 330 and 332 of an optical signal propagating in the first waveguide 302 and the second waveguide 328, respectively. Fundamental TE mode 330 corresponds to the optical signal propagating in first waveguide 302 at line 338 and fundamental TE mode 332 corresponds to the optical signal propagating in waveguide 328 at line 340. Note that the effective indexes refraction of silicon and $Ta_2O_5$ are 2.78 and 1.9, respectively. As shown depicted in fundamental TE modes 330 and 332, a large phase mismatch occurs in the optical signal propagating in each respective material, which results in difficulty achieving a sufficient coupling coefficient for critical coupling. Accordingly, in the example implementations shown in FIG. 3A, to optimize the mode transfer between the first waveguide 302 and second waveguide 328, a first inverse taper pair 336 is provided to optimize the evanescent coupling of an optical signal propagating in the first waveguide 302 into the second waveguide 328 and a second inverse taper pair 318 is provided to optimize the evanescent coupling of an optical signal propagating in the second waveguide 328 into the first waveguide 302.

For example, first waveguide 302 may have a width W1 at an input junction end 312 of second waveguide 328 (e.g., closest toward the optical signal coupling into second waveguide 328) and a width W2 at an output junction end 316 of second waveguide 328 (e.g., closest toward the optical signal coupling out of second waveguide 328). In some implementations, width W1 and width W2 may be the same or substantially similar in width. Second waveguide 328 may have a width W3 between an output junction end 306 of the first waveguide 302 and an input junction end 310 of first waveguide 302. Output junction end 306 may have a width W4 (not shown for illustrative purposes), input junction end 310 may have width W5 (not shown for illustrative purposes), output junction end 316 may have a width W6, and input junction end 312 may have a width W7. In some implementations, width W1 and width W2 may be the same or substantially similar in width, width W4 and W5 may be the same or substantially similar in width, and width W6 and W7 may be the same or substantially similar in width. In the example implementation described above, W1 and W2 may be 500 nm; W3 may be 1 μm; and W4 through W7 may be 200 nm.

Each inverse taper pair 336 and 318 may be implemented as a respective mode converter (e.g., mode converter 336 and mode converter 318, respectively). First inverse taper pair 336 includes taper 304 that narrows width W1 down to width W4 at output junction end 306 of first waveguide 302 and taper 342 that widens width W6 at input junction end 312 up to width W3. Second inverse taper pair 318 includes taper 308 that widens width W5 at input junction end 310 of first waveguide 302 up to width W2 and taper 344 that narrows width W3 down to width W7 at output junction end 316 of second waveguide 328. As illustrated in FIG. 3A, portions of the first waveguide 302 and second waveguide 328 overlap in the z-axis direction within a first taper region 356 having a length L1 corresponding to the first inverse taper pair 336 and portions of the first waveguide 302 and second waveguide 328 overlap in the z-axis direction within a second taper region 358 having a length L2 corresponding to the second inverse taper pair 318. In some implementations, length L1 and length L2 may be the same or substantially similar in width. In an example implementation, L1 and L2 may be 60 μm.

The first inverse taper pair 336 may facilitate coupling of fundamental TE mode between first waveguide 302 and second waveguide 328, while the second inverse taper pair 318 may facilitate coupling of fundamental TE mode between second waveguide 328 and first waveguide 302. The optical coupling may be achieved at each respective inverse taper pairs 336 and 318 may be a result of the tapers comprised thereof. That is, the tapers of the first inverse taper pair 336 may push the fundamental TE mode up into second waveguide 328 so it can be efficiently coupled into the MRR 314, while tapers of the second inverse taper pair 318 may push the fundamental TE mode into first waveguide 302 and downstream in MZI 110. First inverse taper pair 336 and second inverse taper pair 318 may be designed such that they each meet certain performance characteristics. For example, the first inverse taper pair 336 and/or the second inverse taper pair 318 may be designed to be adiabatic. As another example, the first inverse taper pair 336 and/or the second inverse taper pair 318 may be designed such that they respectively couple a fundamental TE mode with very low loss and low back reflection. Mode converters implemented as taper pairs that are designed to be too short in length may suffer from high passive losses.

Figure 3C:
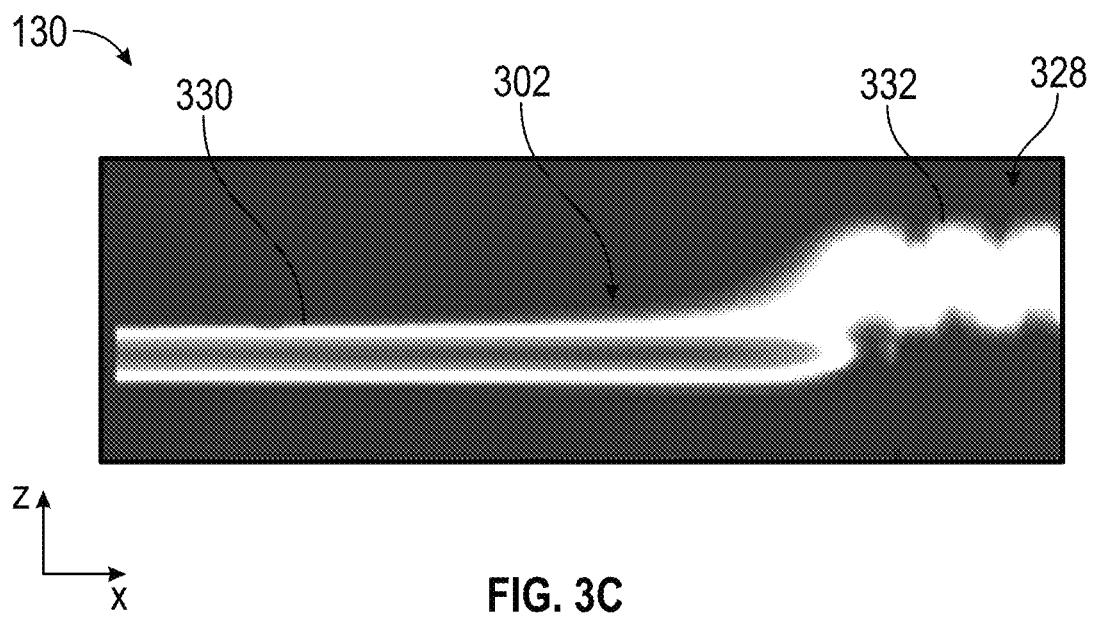
FIG. 3C depicts an example mode transfer within the example resonance cavity of FIGS. 3A and 3B.

FIG. 3C depicts an example of the mode transfer during coupling of an optical signal from the first waveguide 302 into second waveguide 328 within the first taper region 356 viewed along branch 122. For example, FIG. 3C depicts an optical intensity of the fundamental TE mode 330 and 332 along the x-axis direction. The coupling efficiency is according to implementations disclosed herein can be over 97% for a first inverse taper pair 336 having taper lengths L1 of 60 μm. The mode in second waveguide 328 appears to be less concentrated as compared to that in first waveguide 302 because the second waveguide 328 is wider.

The second material according to the example implementations of FIGS. 3A-3C comprises $Ta_2O_5$ due to its large bandgap value (e.g., 3.8 eV), as compared to that of silicon (e.g., 1.12 eV). As a result, the TPA effect and TPA-induced FCD effect, for example, on an optical signal having a wavelength at 1310 nm, are negligible and do not provide for nonlinearity. Further, optical loss is low because free-carrier absorption does not exist. For example, linear loss coefficient is as low as 3 dB/m for straight waveguide formed of $Ta_2O_5$ and 8 dB/m for a 20-μm radius MRR formed of $Ta_2O_5$. Compared to another low-loss material $Si_3N_4$ the nonlinear refractive index of $Ta_2O_5$ is three times higher (e.g., $n_2$ for $Si_3N_4$ is approximately $2.4 \times 10^{-19}$ $m^2/W$ compared to $n_2$ for $Ta_2O_5$ is approximately $7.2 \times 10^{-19}$ $m^2/W$), which allows for a reduced input optical power into activation device 100 to achieve the nonlinearity effect.

Figure 4A:
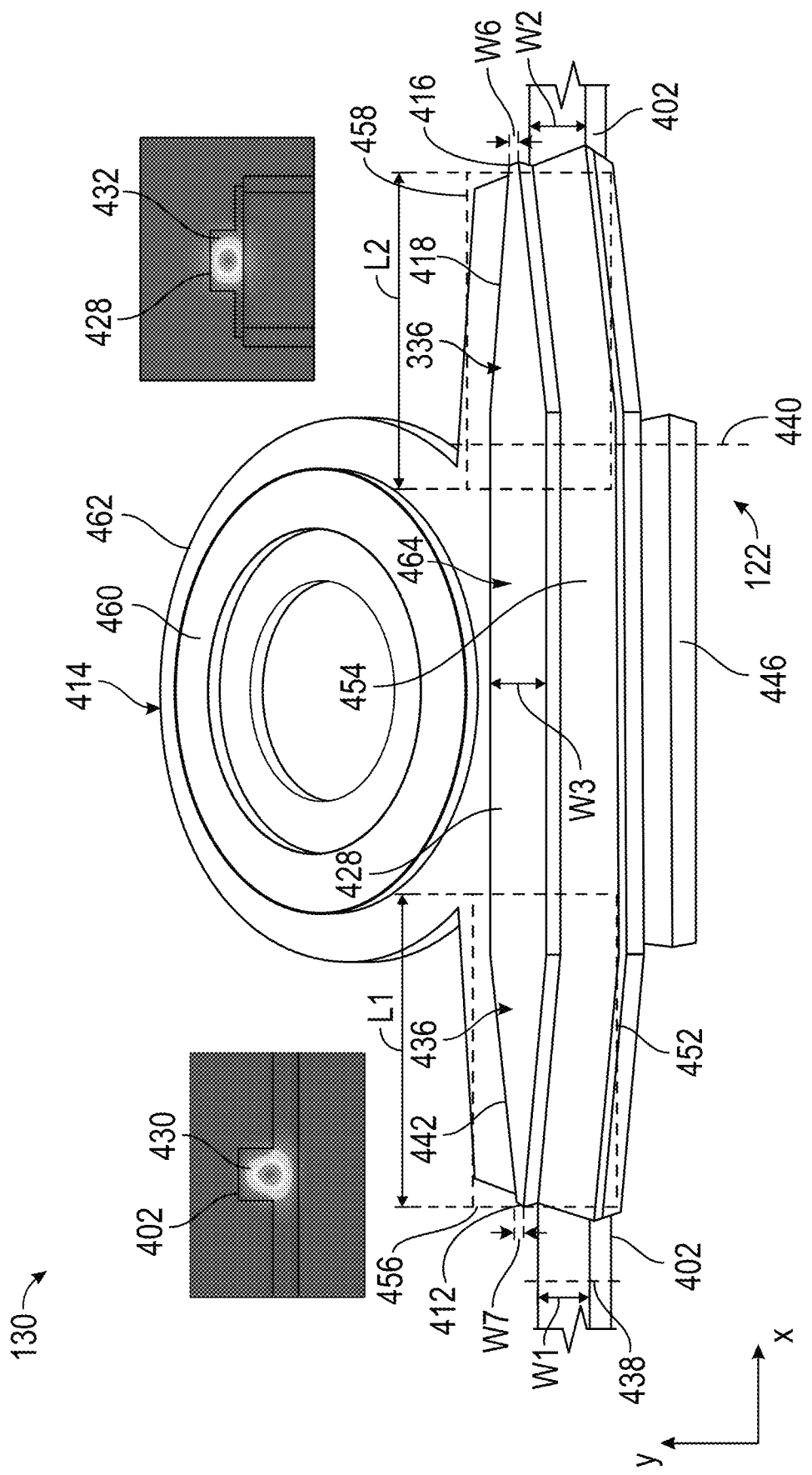
FIGS. 4A-4C depict another example resonance cavity included in all-optical nonlinear activation device of FIG. 2 according to an example implementation.
Figure 4B:
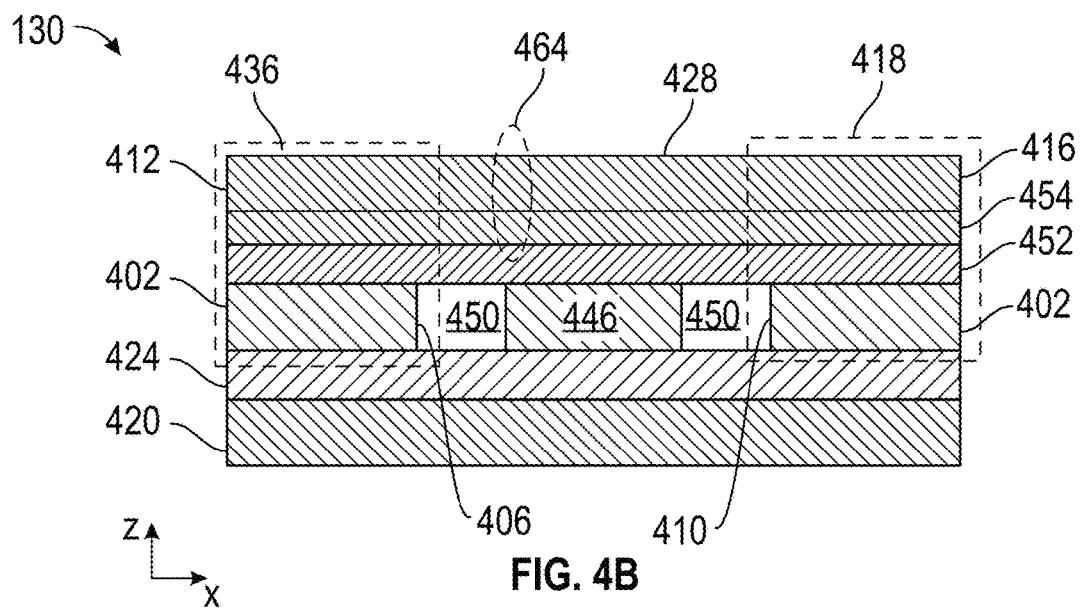
Figure 4C:
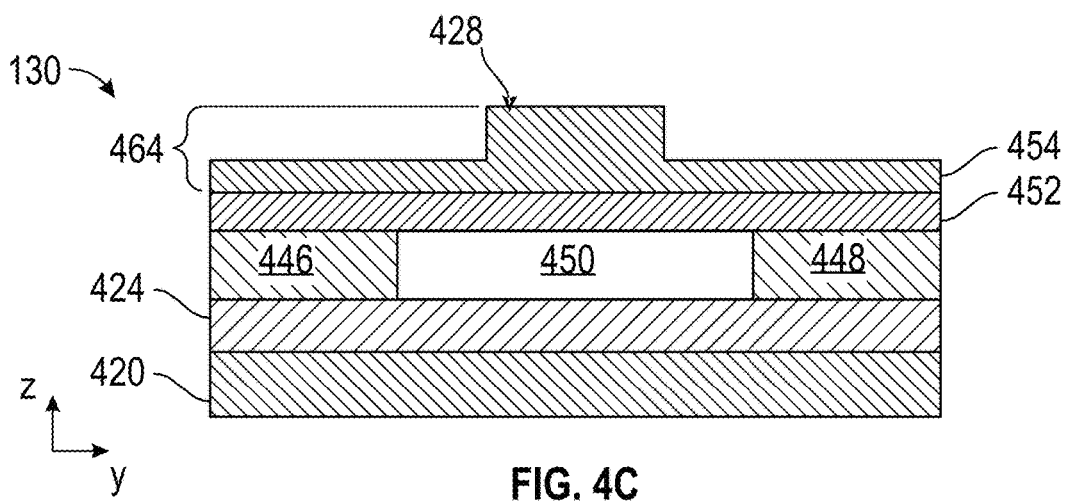

FIGS. 4A-4C depict another example resonance cavity included in all-optical nonlinear activation device 100 according to an example implementation. Particularly, FIGS. 4A-4C depict a zoomed-in perspective view of region 130 of FIG. 2 including a resonance cavity, for example, an example MRR 414 coupled to branch 122 of the activation device 100. In the illustrative example shown in FIG. 4A, branch 122 of the MZI 110 includes first waveguide 402 evanescently coupled to a rib waveguide 464 comprising of a second waveguide 428 and second waveguide slab 454. The MRR 414 comprises a waveguide 460 and waveguide slab 462, which collectively form a rib waveguide that is evanescently coupled to the second waveguide 428. An optical signal propagating in the MZI 110 is evanescently coupled from first waveguide 402 into second waveguide 428, from second waveguide 428 into MRR 414, back into second waveguide 428, and then from second waveguide 428 into first waveguide 402. FIG. 4B depicts a side view of FIG. 4A viewed from a side opposite the MRR 414 along the branch 122 and FIG. 4C depicts a cross-sectional side view of FIG. 4A viewed from a side opposite the MRR 414 taken along line 440.

As shown in FIGS. 4A-4C, activation device 100 may have various widths and thicknesses. As used herein, "length" may be defined along the x-axis in FIGS. 4A-4C, "width" may be defined along the y-axis in FIGS. 4A-4C, and "height" or thickness" may be defined along the z-axis in FIGS. 4A-4C.

In the example shown in FIGS. 4A-4C, the MRR 414 and rib waveguide rib waveguide 464 are formed of heterogenous Group III-V material (for example, AlGaAs in this example) as the second material. In this illustrative example, rib waveguide 464 and MRR 414 are heterogeneously formed on a SOI substrate 420 with a buried oxide (BOX) layer 424 formed thereon. For example, an epitaxial second material can be grown on a Group III-V substrate (e.g., GaAs substrate in this example) and bonded on the SOI platform via a bonding layer 452. In some example implementations, $Al_2O_3$ or $HfO_2$ dielectric layer can be used as bonding layer 452. To form the first waveguide 402, a first material (e.g., silicon or Group IV material) is deposited on the BOX layer 424, which is patterned and etched. In various implementations, the first material is silicon. While only region 130 is shown in FIGS. 4A-4C, the MZC 106 and MZI 110 are formed using similar process, for example, the entire activation device 100 may be formed by providing a SOI substrate with a BOX layer formed thereon, followed by depositing the first material to form the MZC 106 and MZI 110 (e.g., waveguides making up the MZC 106 and MZI 110).

The bonding layer 452 may have a thickness to provide a desired distance between the first waveguide 402 and the rib waveguide 464. The desired distance between first waveguide 402 and rib waveguide 464 along the stacking direction (e.g., z-axis in the context of FIGS. 4B and 4C) can be selected to achieve a desired coupling coefficient between an upper most surface of the first waveguide 402 and a bottom most surface of the rib waveguide 464. For example, the distance therebetween may be selected to optimize the coupling coefficient.

In various embodiments, a plurality of support structures 446 and 448 are provided configured to support the second waveguide 428. For example, a first support structures 446 and second support structures 448 are formed on layer 424. The bonding layer 452 is formed on top of the first and second support structures 446 and 448, thereby forming an air trench 450. The air trench 450 provides for mode confinement of the optical signal within respective waveguides 428 and/or 402. That is, air trench 450 constrains the mode of an optical signal propagating to be within the first waveguides 402 and/or second waveguide 428.

In an illustrative example, the activation device 100 includes fully-etched, 500 nm-wide silicon waveguides (e.g., the MZC 106 and MZI 110 including first waveguide 402) on a passive-SOI platform with a material thickness of 220 nm and a 600 nm wide AlGaAs waveguide (e.g., waveguides 428 and 460) with a thickness of 190 nm for the rib waveguides (e.g., rib waveguide 464 and MRR 414). The waveguides 428 and 460 can be 150 nm thick and the respective slabs 462 and 454 can be 40 nm thick. Further, slabs 454 and 462 can extend 2 μm from either side of the respective waveguides 428 and 460, such that each rib structure has a width of 4.6 μm. The BOX layer 424 can be a 3 μm thick oxide passivation layer, the bonding layer 452 can be 15 nm thick, and the Group III-V may be 600 μm thick The MRR 414 can have a radius of 12 μm and the coupling coefficient is approximately 0.8%, having a gap of approximately 270 nm between the second waveguide 428 and the MRR 414, yielding a Q-factor of about 70000. The distance in the z-axis direction between the upper surface of the first waveguide 402 and the lower surface of the rib waveguide 464 is approximately 15 nm (e.g., distance to bonding layer), which may provide for a coupling coefficient of approximately 98%. While not shown in FIGS. 4A-4C, the MRR 414 may be coupled to phase-shift mechanisms 116.

FIG. 4A includes images of fundamental transverse (TE) modes 430 and 432 of an optical signal propagating in the first waveguide 402 and the second waveguide 428, respectively. Fundamental TE mode 430 corresponds to the optical signal propagating in first waveguide 402 at line 438 and fundamental TE mode 432 corresponds to the optical signal propagating in waveguide 428 at line 440. As noted above, modes 430 and 432 are confined to the respective waveguides via air trench 450. Note that the effective indexes refraction of silicon and AlGaAs are 2.78 and 2.56, respectively. In the example implementations shown in FIG. 4A, to optimize the mode transfer between the first waveguide 402 and second waveguide 428, a first inverse taper pair 436 is provided to optimize the evanescent coupling of an optical signal propagating in the first waveguide 402 into the second waveguide 428 and a second inverse taper pair 418 is provided to optimize the evanescent coupling of an optical signal propagating in the second waveguide 428 into the first waveguide 402.

For example, first waveguide 402 may have a width W1 at an input junction end 412 of second waveguide 428 (e.g., closest toward the optical signal coupling into second waveguide 428) and a width W2 at an output junction end 416 of second waveguide 428 (e.g., closest toward the optical signal coupling out of second waveguide 428). In some implementations, width W1 and width W2 may be the same or substantially similar in width. Second waveguide 428 may have a width W3 between an output junction end 406 of the first waveguide 402 and an input junction end 410 of first waveguide 402. Output junction end 406 may have a width W4, input junction end 410 may have width W5, output junction end 416 may have a width W6, and input junction end 412 may have a width W7. In some implementations, width W1 and width W2 may be the same or substantially similar in width, width W4 and W5 may be the same or substantially similar in width, and width W6 and W7 may be the same or substantially similar in width. In the example implementation described above, W1 and W2 may be 500 nm; and W3 may be 600 nm (with a collective width of 4.6 µm for rib waveguide 464); and W4 through W7 may be 200 nm.

Each pair of inverse tapers 436 and 418 may be implemented as a respective mode converter (e.g., mode converter 436 and mode converter 418, respectively). First inverse taper pair 436 includes a taper (similar to taper 304 of FIG. 4A) that narrows width W1 down to width W4 at output junction end 406 of first waveguide 402 and taper 442 that widens width W6 at input junction end 412 up to width. Second inverse taper pair 418 includes taper (similar to taper 308 of FIG. 4A) to widen width W5 at input junction end 410 of first waveguide 402 up to width W2 and taper 444 that narrows width W3 down to width W7 at output junction end 416 of second waveguide 428. As illustrated in FIG. 4A, portions of the first waveguide 402 and second waveguide 428 overlap in the z-axis direction within a first taper region 456 having a length L1 corresponding to the first inverse taper pair 436 and portions of the first waveguide 402 and second waveguide 428 overlap in the z-axis direction within a second taper region 458 having a length L2 corresponding to the second inverse taper pair 418. In some implementations, length L1 and length L2 may be the same or substantially similar in width. According to some embodiments, as shown in FIG. 4A, the slab 454 and bonding layer 452 may be tapered similar to taper 442 of the first inverse taper pair 436, for example, within the first taper region 456. Similarly, the slab 454 and bonding layer 452 may be tapered similar to taper 444 of the second inverse taper pair 436, for example, within the second taper region 458.

The first inverse taper pair 436 may facilitate coupling of fundamental TE mode between first waveguide 402 and second waveguide 428, while the second inverse taper pair 418 may facilitate coupling of fundamental TE mode between second waveguide 428 and first waveguide 402. The optical coupling may be achieved at each respective inverse taper pair 436 and 418 may be a result of the tapers comprised thereof. That is, the tapers of the first inverse taper pair 436 may push the fundamental TE mode up into second waveguide 428 so it can be efficiently coupled into the MRR 414, while tapers of the second inverse taper pair 418 may push the fundamental TE mode into first waveguide 402 and downstream in MZI 110. First inverse taper pair 436 and second inverse taper pair 418 may be designed such that they each meet certain performance characteristics. For example, the first inverse taper pair 436 and/or the second inverse taper pair 418 may be designed to be adiabatic. As another example, the first inverse taper pair 436 and/or the second inverse taper pair 418 may be designed such that they respectively couple a fundamental TE mode with very low loss and low back reflection. Mode converters implemented as taper pairs that are designed to be too short in length may suffer from high passive losses.

Figure 4D:
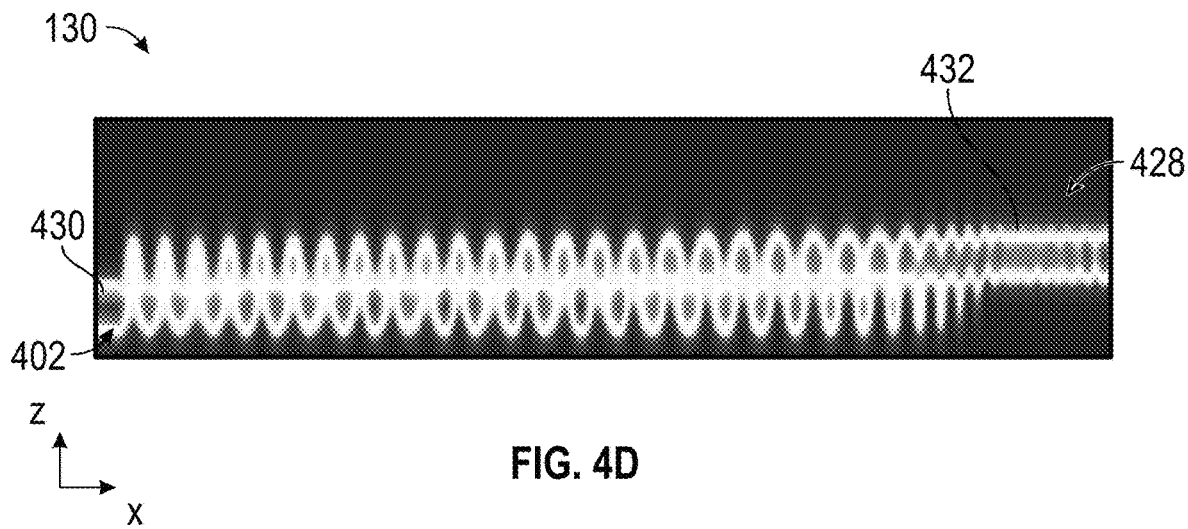
FIG. 4D depicts an example mode transfer within the example resonance cavity of FIGS. 4A-4C.

FIG. 4D depicts an example of the mode transfer during coupling of an optical signal from the first waveguide 402 into second waveguide 428 within the first taper region 456 viewed along branch 122. For example, FIG. 4D depicts optical intensity of the fundamental TE mode 430 and 432 along the x-axis direction. The coupling efficiency is according to implementations disclosed herein can be over 98% for a first inverse taper pair 436 having taper lengths L1 of 60 µm. The mode in second waveguide 428 appears to be less concentrated as compared to that in first waveguide 402 because the second waveguide 428 is wider.

The second material according to the example implementations of FIGS. 4A-4D second material comprises a composition $Al_xGa_{1-x}As$, where x is at least greater than 0.1. In various implementations, the value of x is greater than 0.2. In an example implementation, the value of x is selected to be 0.4. The bandgap value of the second material may be based on the amount of Al in the composition. For example, Table 2 below provides example values of x for $Al_xGa_{1-x}As$ and the corresponding bandgap value.

TABLE 2

| X | Bandgap (eV) |
| --- | --- |
| 0 | 1.42 |
| 0.1 | 1.55 |
| 0.2 | 1.67 |
| 0.3 | 1.8 |
| 0.4 | 1.92 |
| 0.5 | 2 |

In the case that the composition of Al in the second material is 0.4, the bandgap value of the second material is 1.92 eV, which leads to a TPA cutoff wavelength of 1290 nm. Thus, a TPA effect at 1310 nm is negligible and does not provide for nonlinearity. Optical loss is also low, for example, linear loss coefficient is as low as 60 dB/m for a 12-µm radius MRR formed of AlGaAs as set forth herein. The quality factor of the MRR 414 can be as over $10^6$. Thus, the nonlinear refractive index of AlGaAs is approximately $2.6 \times 10-7$ $m^2/W$, which is more than one order of magnitude larger than Si and allows for a reduced input optical power into activation device 100 so to achieve the nonlinearity effect. Similar TPA effects can be achieved with a composition of Al that is greater than 0.2.

Figures 9A, 9B, 9C:
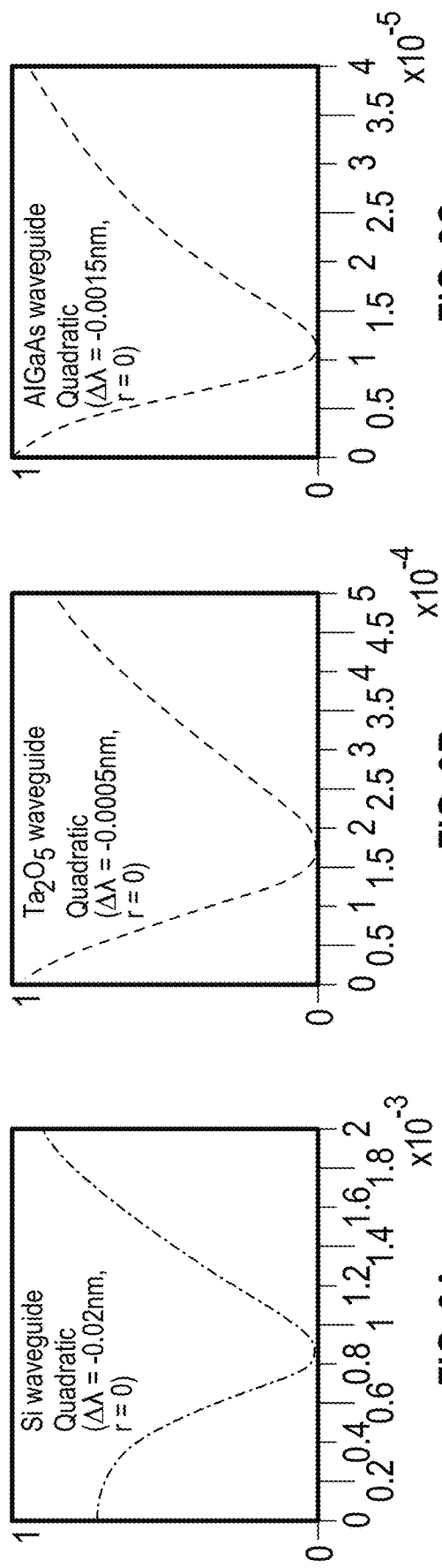

FIGS. 5A-9C depict graphical representations of various normalized nonlinear activation functions as a function of input optical power, in accordance with implementations disclosed herein. The vertical axis of each graphical representation illustrates output optical power that is normalized to provide the normalized nonlinear activation function of each respective graph. FIGS. 5A, 6A, 7A, 8A, and 9A depict graphical representations of normalized nonlinear activation functions in a case where the MRR 114 of activation device 100 comprises a silicon waveguide. FIGS. 5B, 6B, 7B, 8B, and 9B depict graphical representations of normalized nonlinear activation functions in a case where the activation device 100 comprises second waveguide 328 and MRR 314 formed of $Ta_2O_5$, as described in relation to FIGS. 3A-3C. FIGS. 5C, 6C, 7C, 8C, and 9C depict graphical representations of normalized nonlinear activation functions in a case where the activation device 100 comprises second waveguide 428 and MRR 414 formed of AlGaAs, as described in relation to FIGS. 4A-4D. FIGS. 5A-5C depict graphical representations of an example radial-basis activation function. FIGS. 6A-6C depict graphical representations of an example ReLU activation function. FIGS. 7A-7C depict graphical representations of an example inverse ReLU activation function. FIGS. 8A-8C depict graphical representations of an example leaky ReLU activation function. FIGS. 9A-9C depict graphical representations of an example quadratic activation function. In each of FIGS. 5A-9D, r represents the power splitting ratio for the MZC 106 (e.g., ratio of power into branch 124 over power into branch 122 of MZI 110), which can be tuned using the phase-shift mechanism 108, and 0A represents detuning of the wavelength of the input optical signal from the resonant frequency of the respective MRR, which can be tuned using phase-shift mechanism 112. As noted above, the resonance frequency can be tuned using phase-shift mechanisms 116.

In a case of MRR 114 (e.g., a silicon waveguide), the FCD effect induced nonlinearity effect is generally larger than the Kerr effect induced nonlinearity, which means the resonance frequency of the silicon formed MRR will blue shift at high power density. Whereas, in the case of the $Ta_2O_5$ or AlGaAs formed MRRs of FIGS. 3A-4D, the Kerr effect dominates the nonlinearity since there are nearly minimal free carriers present and thus no FCD effect. Therefore, the relative wavelength detuning between the input optical signal and the resonance frequency of a respective MRR is set opposite for the Si waveguide with respect to $Ta_2O_5$ or AlGaAs waveguides, as shown in FIGS. 5A-9C.

In the case of MRR 114 comprising of an Si waveguide, a radial-basis-like function (e.g., FIG. 5A) occurs when the resonance of MRR 114 is red wavelength-detuned (e.g., relative detuning is toward the red end of the electromagnetic spectrum) at the origin of the graphical representation. Referring to FIG. 5A, the normalized output optical power (e.g., normalized nonlinear activation function) initially increases linearly with the input optical power. When the resonance frequency of the MRR 114 blue shifts toward to the frequency of the input optical signal, the amplitude and phase of the MRR 114 undergo a sharp transition and a dip in output optical power is seen around a transition point. As the resonance of the MRR 114 continues to blue shift, there will be less coupling to MRR 114, thus resulting in the output optical power increasing sharply with relatively small phase changes as shown in FIG. 5A.

An ReLU activation function can be obtained by further increasing the optical power of the input optical signal, as shown in FIG. 6A. The output optical power increases smoothly after a threshold input optical power and the slope of the smooth increase region can be tuned by adjusting the splitting ratio r via first phase-shift mechanism 108 of MZC 106.

When the resonance frequency is tuned to the frequency of the input optical signal, the majority of the optical signal is coupled to the MRR 114 (e.g., r is small) and the inverse ReLU is obtained as shown in FIG. 7A. The slope of the linear portion can be changed via a change in phase difference between two branches of the MZI 110 via second phase-shift mechanism 112.

When an additional phase of $\pi$ is applied in one branch, the leaky ReLU can be realized as shown in FIG. 8A. For example, the additional phase can be applied by tuning the phase-shift mechanisms 112.

A quadratic nonlinear activation function can occur when the resonance frequency of MRR 114 is red-shifted and r is small, which corresponds to the sharp transition of the output optical power, as shown in FIG. 9A.

For a MRR formed of $Ta_2O_5$ or AlGaAs waveguides, the above-described phenomenon's operate in a manner that is similar to the above, but in an opposite direction. That is, for example, the various tunings described above in relation to FIGS. 5A, 6A, 7A, 8A, and 9A to achieve the various functions are opposite of those for MRR 314 and/or MRR 414 and the ratios are flipped.

Due to the high nonlinearity and low loss of the second materials according to the implementations disclosed herein, the activation device 100 can switchably realize the various nonlinear activation functions, as set forth above, with significantly less input optical power as compared to a Si structure. For example, due to the high nonlinearity and low loss of $Ta_2O_5$, implementations comprising $Ta_2O_5$ as the second material needs one third the input optical power required by the Si structure, as shown in FIG. 5A as compared to FIGS. 5B and 5C. Similarly, due to the high nonlinearity and low loss of AlGaAs, implementations comprising AlGaAs as the second material need 1% of the input optical power compared to the Si structure. That is, the transition point of FIG. 5A occurs are 1.2e−3 W of input optical power, while the transition point occurs at 3e−4 W in FIG. 5B and 1.2e−5 W in FIG. 5C. Similar reductions in input optical power are shown in FIGS. 6A-9C. Selecting between $Ta_2O_5$ and AlGaAs may depend on the desired optical power to achieve a desired nonlinear function, as shown in FIGS. 5A-9C, as well as the particular project and platform. For example, as noted above, implementations comprising $Ta_2O_5$ requires one third of the input optical power as compared to a Si structure, while implementations comprising AlGaAs require 1% of optical power compared to Si; however, $Ta_2O_5$ and AlGaAs have different integration methods on a Si platform (as described above in related to FIGS. 3A-4D). Thus, the materials have different usages because fabrication may be done using $Ta_2O_5$ or AlGaAs for a given application and platform.

Accordingly, the example implementations disclosed herein provide advantages for photonic neural applications since the power requirements in such networks is less than 100 μW, which is lower than that of conventional all-optical activation devices. The lower input optical power level translates to lower power required from an input optical source (e.g., laser and/or semiconductor optical amplifier (SOA), thereby reducing the electric energy consumption and improving system linearity.

Accordingly, all-optical reconfigurable activation functions according to the implementations disclosed herein provide several advantages. For example, one non-limiting advantage is that integration of SOI platforms with $Ta_2O_5$ and/or AlGaAs results in less input optical power requirements in order to generate and switch between various different nonlinear activation functions compared to conventional approaches. Further, the implementations disclosed herein allow for low-loss waveguides, which can be designed for linear weight bank and facilitate low-loss and high-efficient neuromorphic photonic networks.

Another example non-limiting advantage is that a heterogeneously bonded AlGaAs platform (e.g., FIGS. 4A-4D) may comprise a MOS-capacitor structure formed by the AlGaAs of second waveguide 428 and the first waveguide 402. Voltage bias applied between the materials can be controlled to achieve a phase shift without any static power consumption. This MOS structure is not only suitable for configuring (e.g., switching) between nonlinear functions, but can also be applied in MZI 110. An optical source (e.g., a laser) can also be integrated closely on a single platform to minimize transition losses. While AlGaAs platform may already include such MOS structures, some implementations of other second materials (such as $Ta_2O_5$) may be adapted to utilize the MOS-capacitor structures.

Another example of a non-limiting advantage is that implementations disclosed herein can be applied on current Silicon photonics platforms and are compatible with CMOS structures. Some passive and linear structure can be directly applied on SOI platform.

Additionally, implementations disclosed herein can generate activation functions based on the ultrafast Kerr effect, which may achieve high-speed operation. For example, high-speed nonlinear activation and/or changing between different activation functions (e.g., as described above in related to FIGS. 5A-9C). The FCD effect, which is a limitation on processing speed due to the lifetime of free-carriers, is negligible as described above. Further, since the TPA-induced free carriers are negligible, thermal-induced resonance shift is also negligible. Thus, the implementations disclosed herein may operate at power intensity levels that are otherwise not achievable using a Silicon based structures.

Phase tuning according to the implementations disclosed herein may be achieved through many different approaches. For example, phase-shift mechanisms described throughout the present disclosure, such as phase-shift mechanisms 108, 112, and/or 116 of FIG. 2, may be provided as any mechanism capable of inducing a phase shift in light propagating through the respective waveguide. For example, as alluded to above, phase-shift mechanism 116 can be configured to tune the resonant frequency by inducing a change in the refractive index of a resonate structure (e.g., MMR 114) over a certain length, for example, through carrier injection (e.g., charge accumulation), charge depletion, or changing temperature of a portion or all of the resonator structure. As another example, phase-shift mechanisms 108 and/or phase-shift mechanisms 112 may induce a phase shift within a respective branch by inducing a change in the refractive index of a waveguide over a certain length, for example, through carrier injection (e.g., charge accumulation), charge depletion, or changing temperature of a portion or all of the resonator structure.

In a first example, the phase tuning-mechanisms disclosed herein may comprises one or more heating/cooling elements (e.g., resistive heaters, or the like) that can be operated to change the temperature of a waveguide (e.g., waveguide 302, waveguide 402, MRR 114, MRR 314, MRR 414, etc.). The heating elements may be, for example, a resistor (e.g., metal component) physically coupled to a portion or all of a respective waveguide. A current may then be applied to the resistor, which generates heat transferred to the respective waveguide causing a change in temperature. Control of the current may tune the temperature so to tune the phase and/or resonant frequency. A change in phase or phase shift ($\Delta\varphi$) of the waveguide can be induced based on a change in temperature as follows:

$$\Delta\varphi = \frac{2\pi L_H}{\lambda_0} \frac{dn}{dT} \Delta T \qquad \text{Eq. 8}$$

where $L_H$ is a length of the heating element coupled to the respective waveguide, $dn/dT$ is a thermo-optic coefficient dependent on the material from which the respective waveguide is formed (e.g., indicative of a change in refractive index with the response to temperature), $\Delta T$ is the change in temperature of the respective waveguide, and $\lambda_0$ is the free space wavelength of the light. Thus, applying or subtracting heat from the respective waveguide will induce a change in phase.

Figure 10A:
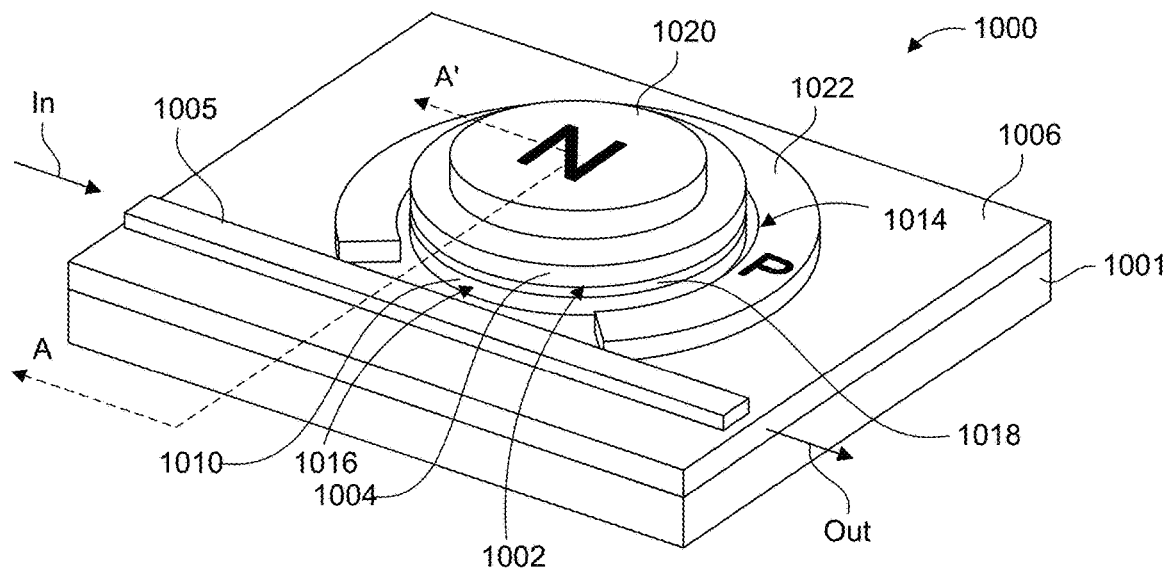
FIGS. 10A and 10B illustrate an example phase-shift mechanism comprising a metal oxide semiconductor capacitor (MOSCAP) according to implementations of the present disclosure.
Figure 10B:
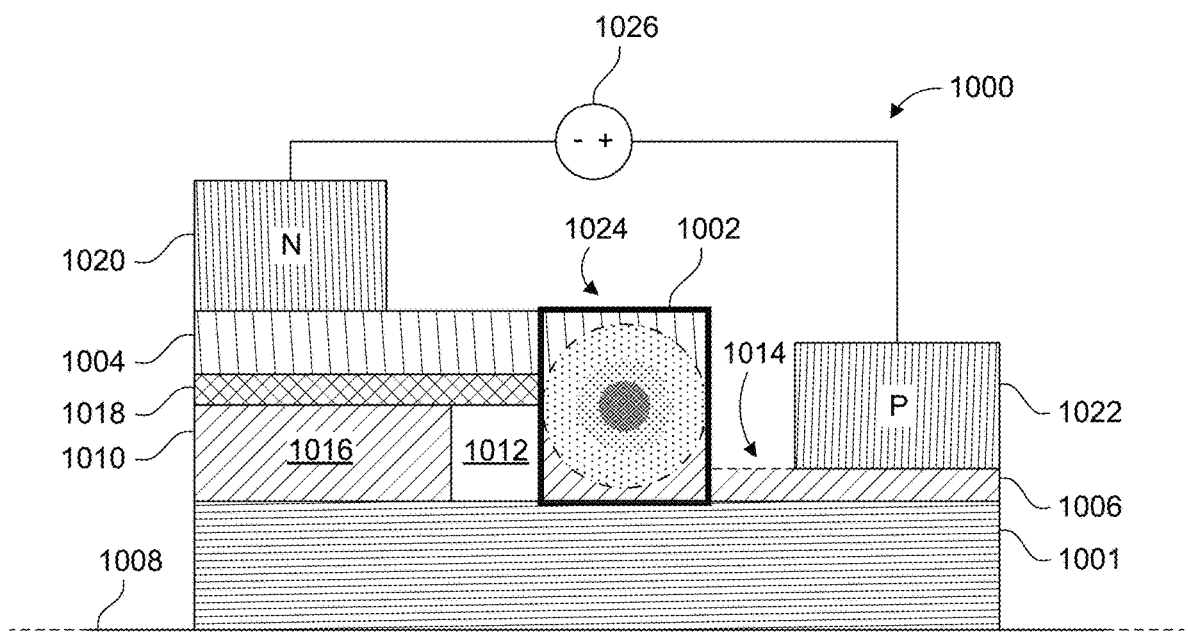

FIGS. 10A and 10B illustrate another example implementation of a phase-shift mechanism according to implementations of the present disclosure. FIGS. 10A and 10B illustrate an example hybrid MOS ring-resonator optical modulator 1000 that may be implemented as a phase-tuning mechanism, for example, one or more of phase-shift mechanisms 108, 112, and 114 of FIG. 2. FIG. 10A is a perspective view of the optical modulator 1000 and FIG. 10B is a section view of the hybrid MOS optical modulator 1000 taken along a line A-A' shown in FIG. 10A.

The optical modulator 1000 includes an optical waveguide 1002, a cathode 1004 comprising a first material and formed in the optical waveguide 1002, and an anode 1006 comprising a second material that is different from the first material and formed in the optical waveguide 1002. The anode adjoins the cathode. A capacitor is defined between the anode and the cathode.

In some examples, a substrate 1001 comprises oxide grown on an underlying layer 1008. A silicon layer 1010 is formed on the substrate 1001. A trench 1012 separates the optical modulator 1000 into two portions 1014 and 1016. The first portion 1014 comprises the anode 1006. The optical waveguide 1002 is formed in the anode 1006. The cathode 1004 is integrated to the second portion 1016. The optical waveguide 1002 may be, for example, evanescently coupled to branch 118 in the case of phase-shift mechanism 108, evanescently coupled to branch 122 in the case of phase-shift mechanism 112, and/or the waveguide of MRR 114 in the case of phase-shift mechanism 116. In various embodiments, the cathode 1004 comprises a layer of Group III-V material as the first material. A MOS capacitor 1024 is defined between the cathode 1004 and the anode 1006.

A dielectric 1018 is formed between the cathode 1004 and the anode 1006. The dielectric 1018 may be an electrically insulating material formed between the cathode 1004 and anode 1006 of the MOS capacitor 1024, and the polarization of the dielectric 1018 by an applied electric field may increase the surface charge of the MOS capacitor 1024 for a given electric field strength. The dielectric 1018 can be native oxides of the cathode or the anode or both, or can be external dielectric materials such as high-k dielectrics or polymers which can be formed by deposition, oxidation, wafer bonding or other dielectric coating methods.

The cathode 1004 may comprise negatively-doped Group III-V material (such as GaAs, AlGaAs, or the like) and the anode 1006 may comprise positively-doped silicon. A cathode electrode 1020 is disposed on the cathode 1004 and an anode electrode 1022 is disposed on the anode 1006. When a voltage is applied between the electrodes, carrier accumulation, depletion or inversion can occur around dielectric 1018. Due to the capacitor region overlapping with the optical waveguide, carrier concentration change may lead to changes in refractive index and propagation loss within waveguide 1002. By biasing the voltage applied between the electrodes, the refractive index may be modulated accordingly, thereby inducing optical intensity modulation, phase shift modulation, and attenuation.

In a case where modulator 1000 is implemented as phase-shift mechanism 108, light may be evanescently coupled into the optical waveguide 1002 from a waveguide of branch 118 (e.g., at least a portion of light propagating in branch 118 is transferred into the optical waveguide 1002). In a case where modulator 1000 is implemented as phase-shift mechanism 112, light may be evanescently coupled into the optical waveguide 1002 from a waveguide of branch 122 (e.g., at least a portion of light propagating in a first waveguide of branch 118 is transferred into the optical waveguide 1002). In a case where modulator 1000 is implemented as phase-shift mechanism 116, light may be evanescently coupled into the optical waveguide 1002 from a second waveguide of branch 118 (e.g., at least a portion of light propagating in branch 118 is transferred into the optical waveguide 1002). In each such implementation, light propagating through optical waveguide 1002 is modulated, attenuated, and phase shifted based changes in the waveguide modal refractive index induced by biasing of the MOS capacitor 1024. A portion of the modulated and attenuated light can evanescently couple from the optical waveguide 1002 into another waveguide 1005. The other waveguide 1005 may be implemented as branch 118 (in the case of optical modulator 1000 being implemented as phase-shift mechanism 108), as branch 122 (in the case of optical modulator 1000 being implemented as phase-shift mechanism 112), and/or second waveguide 128 (in the case of optical modulator being implemented as phase-shift mechanism 116).

For example, FIG. 10B includes a DC power source 1026. The DC power source 1026 acts as a signal source and has a negative terminal connected to the cathode electrode 1020 and a positive terminal connected the anode electrode 1022. This results in a migration of negative charges from the cathode 1004 toward a side of the optical waveguide 1002 adjacent to the cathode 1004, and migration of positive charges ("holes") from the anode 1006 to an opposite side of the waveguide 1002 (also referred to herein as accumulation mode). In other examples the polarity of the DC power source 1026 may be reversed. Reversing the polarity of the DC power source 1026 causes a migration of negative charges from the waveguide 1002 toward cathode electrode 1020, and migration of holes from the waveguide 1002 toward anode electrode 1022 (also referred to herein as depletion mode).

The MOS capacitor 1024 forms at the boundary between the Group III-V material of the cathode 1004 and the underlying capacitor portion of the intrinsic silicon or other Group IV material. A thin layer of silicon and Group III-V oxides (e.g., dielectric 1018) forms naturally at this boundary and serves as a dielectric for the capacitor. In some examples, this thin layer has a thickness on a nanoscale, for example, a few nanometers thick. In some examples, steps need not be taken to encourage the formation of dielectric 1018. In other examples, the formation of dielectric 1018 may be stimulated, for example by elevating the temperature, exposing the materials to an oxygen-rich atmosphere, or other suitable technique.

As discussed previously, the MOS capacitor 1024 is formed inside the optical waveguide 1002 so that charge carriers that accumulate/deplete on either side of the capacitor dielectric have the effect of changing the index of refraction of the optical waveguide and waveguide loss (e.g., loss or attenuation of propagated signal power in the waveform).

The MOS capacitor 1024 can operate in accumulation, depletion or inversion mode (e.g., accumulation of electrons at the dielectric layer in addition to presence of holes). As discussed above, a DC voltage can be applied between an anode and cathode, causing a thin charge layer to accumulate, deplete, or invert on both sides of the dielectric layer 1018. The resulting change in free carrier density causes a change in refractive index n of the optical waveguide 1002, which is manifested as a change in the effective refractive index of the optical mode ($\Delta n_{eff}$). The amount of change or modulation in the effective refractive index ($\Delta n_{eff}$) and associated change in optical losses ($\Delta \alpha$) can be described with as follows:

$$\Delta n_{eff} = \frac{-q^2 \lambda_0^2}{8\pi^2 c^2 n \varepsilon_0} \left( \frac{\Delta N_e}{m_{ce}^*} + \frac{\Delta N_h}{m_{ch}^*} \right)$$ Eq. 9

$$\Delta \alpha = \frac{-q^3 \lambda_0^2}{4\pi^2 c^3 n \varepsilon_0} \left( \frac{\Delta N_e}{m_{ce}^{*2} \mu_e} + \frac{\Delta N_h}{m_{ch}^{*2} \mu_h} \right)$$ Eq. 10

Where q is electrical charge applied to the cathode 1004 and the anode 1006, c is the speed of light in vacuum, $\varepsilon_0$ is the permittivity of free space, n is the material refractive index, $\Delta N$ represents a change in carrier density such that $\Delta N_e$ represents the change in carrier density in terms of electrons that $\Delta N_h$ represents the change in carrier density in terms of holes, m*represents the relative effective mass of electrons (m*$_{ce}$) and holes (m*$_{ch}$), $\mu_h$ represents the hole mobility, $\mu_e$ represents the electron mobility, and $\lambda_0$ is the free space wavelength.

An optical phase shift ($\Delta \varphi$) at the end of the capacitor depends on the magnitude of the voltage-induced $\Delta n_{eff}$, the device length L, and the optical wavelength $\lambda$. In this example, the optical phase shift can be calculated as $\Delta \varphi = 2\pi \Delta n_{eff} L \lambda$. Thus, the optical phase of the light within optical waveguide 1002 may be shifted based on the voltage-induced $\Delta n_{eff}$. In various examples, the waveguide loss in silicon and Group III-V material may also change simultaneously as carrier density changes, and control of the change in the waveguide loss can be used as an optical attenuator. For example, changes in waveguide loss may be controlled based on the change in carrier density, which may impart attenuation of the waveguide losses. The attenuated waveguides losses can be used to modulate a signal.

As shown in FIG. 10A, the optical modulator 1000 may be a ring resonator optical modulator. In this case, trench 1012, shown in FIG. 10B, is provided as an annular trench that divides the optical modulator into first and second portions 1014 and 1016, respectively. Similarly, the anode 1006 is provided as an annular-shaped anode in the second portion and the cathode 1004, dielectric 1018, and the silicon layer 1010 are cylindrical in shape in the first portion. The MOS capacitor 1024 is defined across a boundary between the cathode and the anode.

As described above, the depletion or accumulation of charges at the interfacial layer results in a change of free carrier density that changes the local refractive index of the waveguide 1002. As described above, with reference to FIGS. 2-9C, the change in the refractive index of waveguide 1002 may be used to induce a phase shift (e.g., offset the phase) of light propagating in waveguide 1002. When used as a phase-shift mechanism 108, the phase shift based on a voltage bias to the MOSCAP 1024 may be used to tune the MZC 106, for example, tuning the ratio of optical power supplied from the directional coupler into respective branches of the MZI 110 based on a controlled phase-difference. When used as a phase-shift mechanism 112, the phase shift based on a voltage bias to the MOSCAP 1024 may be used to tune relative phase difference between an optical signal propagating in branch 124 and that in branch 122. As described above in relation to FIGS. 5A-9C, tuning the relative phase difference between branch 122 and 124 may configure the activation device 100 between different activation functions. When used as phase-shift mechanism 116, the phase shift based on a voltage bias to the MOSCAP 1024 may be used to tune the resonance frequency of MRR 114. Controlled tuning of the resonance frequency of MRR 114 can be used to configure the activation device 100 between different activation functions, as described above in connection with FIGS. 5A-9C.

Figure 11:
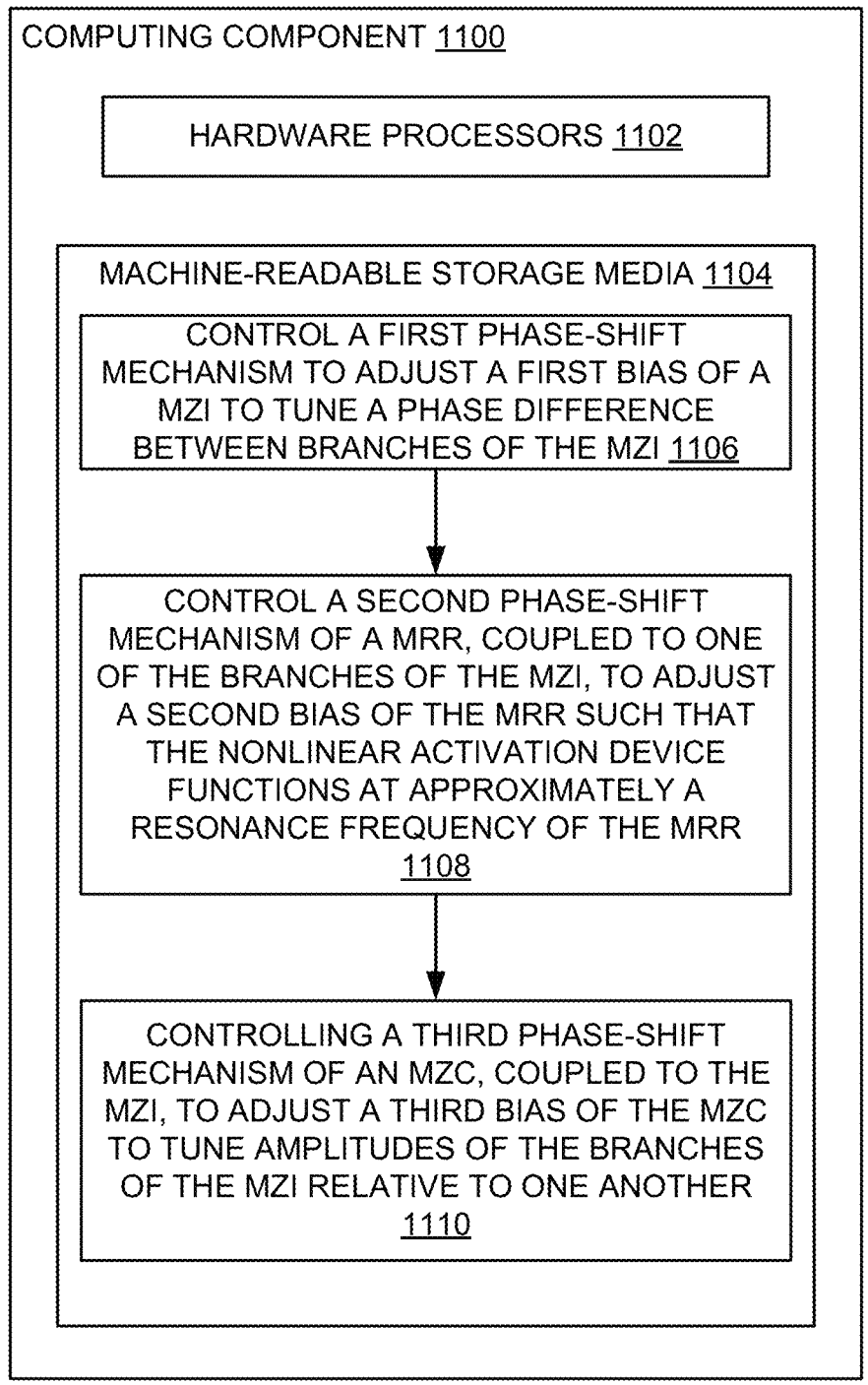
FIG. 11 is an example computing component that may be used to implement various features of all-optical nonlinear activation devices in accordance with the implementations disclosed herein.

FIG. 11 illustrates an example computing component that may be used to operate a nonlinear activation function in accordance with various embodiments. Referring now to FIG. 11, computing component 1100 may be, for example, a server computer, a controller, or any other similar computing component capable of processing data. In the example implementation of FIG. 11, the computing component 1100 includes a hardware processor 1102, and machine-readable storage medium for 1104.

Hardware processor 1102 may be one or more central processing units (CPUs), semiconductor-based microprocessors, and/or other hardware devices suitable for retrieval and execution of instructions stored in machine-readable storage medium 1104. Hardware processor 1102 may fetch, decode, and execute instructions, such as instructions 1106-1110, to control processes or operations for operating a nonlinear activation function, such as those described in connection with FIGS. 2-4D. As an alternative or in addition to retrieving and executing instructions, hardware processor 1102 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 1104, may be any electronic, magnetic, optical, or other physical storage device that contains or stores executable instructions. Thus, machine-readable storage medium 1104 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 1104 may be a non-transitory storage medium, where the term "non-transitory" does not encompass transitory propagating signals. As described in detail below, machine-readable storage medium 1104 may be encoded with executable instructions, for example, instructions 1106-1110.

Hardware processor 1102 may execute instruction 1106 to control a first phase-shift mechanism to adjust a first bias of an MZI to tune a phase difference between branches of the MZI. For example, the MZI may be implemented as MZI 110 and the first phase-shift mechanism implemented as phase-shift mechanism 112 of FIG. 2. As described above, the phase-shift mechanism 112 can be controlled to tune a phase difference between branch 122 and branch 124, so to convert a nonlinear phase to a nonlinear response that is transmitted via an output of the MZI.

Hardware processor 1102 may execute instruction 1108 to control a second phase-shift mechanism of a MRR, coupled to one of the branches of the MZI, to adjust a second bias of the MRR such that the nonlinear activation device functions at approximately a resonance frequency of the MRR. For example, the MRR may be implemented as one of MRR 114, 314, and/or 414 of FIGS. 2-4D and the second phase-shift mechanism implemented as phase-shift mechanism 116. As described above, the phase-shift mechanism 116 may be controlled to tune the resonance frequency of the MRR, thereby providing a nonlinearity, which is converted by the phase-shift mechanism 112. As described above, the MRR comprises a waveguide formed of a second material as set forth above in relation to FIGS. 2-4D. For example, the second material may be a material with bandgap over 1.9 eV and having a nonlinear refractive index that is greater than $3 \times 10^{-20}$, and a linear loss coefficient that is less than 200 dB/m.

Hardware processor 1102 may execute instruction 1110 to control a third phase-shift mechanism of an MZC, coupled to the MZI, to adjust a third bias of the MZC to tune amplitudes of the branches of the MZI relative to one another. For example, the MZC may be implemented as MZC 106 having phase-shift mechanism 108 coupled to a branch thereof. The MZC 106 operates as a tunable directional coupler based on tuning of the phase-shift mechanisms 108. As described above, the phase-shift mechanism 108 provides for tuning of the splitting ratio of the optical power supplied to each branch of the MZI 110. Thus, the amplitude of the optical power supplied to each branch of the MZI 110 can be balanced through tuning of the phase-shift mechanism 108.

Accordingly, as described above with reference to FIGS. 5A-9C, the first, second, and third biases can be individually and separately controlled by adjusting the phases and optical power within the all-optical activation device so as to achieve a desired activation function. For example, phase-shift mechanism 108, 112, and 116 may be controlled to set the first, second, and third bias to a first condition to achieve a first activation function (for example, radial-basis-like function of FIG. 5A). Then one or more of the phase-shift mechanisms 108, 112, and 116 can be tuned to adjust one or more of the first, second, and third bias to a second condition to achieve a second activation function (for example, ReLU activation function by tuning the optical power of the input optical signal, as shown in FIG. 6A; tuning a resonance frequency to achieve an inverse ReLU activation function, and so on as described in connection with FIGS. 5A-9C).

Figure 12:
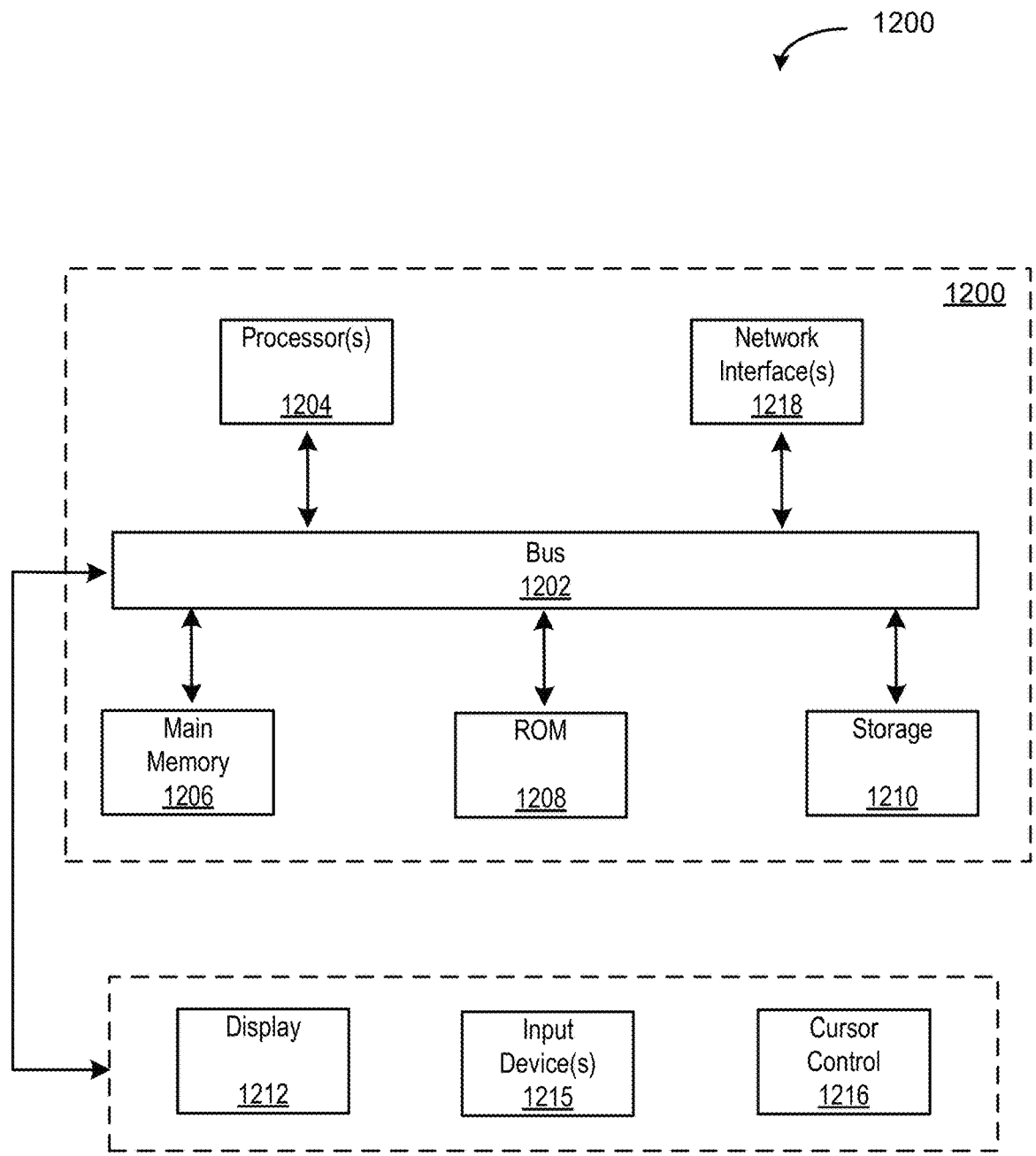
FIG. 12 is an example computer system that may be used to implement various features of all-optical nonlinear activation devices of the present disclosure.

FIG. 12 depicts a block diagram of an example computer system 1200 in which various of the embodiments described herein may be implemented. The computer system 1200 may be implemented, for example, to control one or more of the phase-shift mechanisms 108, 112, and/or 116 and includes a bus 1202 or other communication mechanism for communicating information, one or more hardware processors 1204 coupled with bus 1202 for processing information. Hardware processor(s) 1204 may be, for example, one or more general purpose microprocessors.

The computer system 1200 also includes a main memory 1206, such as a random access memory (RAM), cache and/or other dynamic storage devices, coupled to bus 1202 for storing information and instructions (e.g., instructions 1106-1110) to be executed by processor 1204. Main memory 1206 also may be used for storing temporary variables or other intermediate information during execution of instructions to be executed by processor 1204. Such instructions, when stored in storage media accessible to processor 1204, render computer system 1200 into a special-purpose machine that is customized to perform the operations specified in the instructions.

The computer system 1200 further includes a read only memory (ROM) 1208 or other static storage device coupled to bus 1202 for storing static information and instructions for processor 1204. A storage device 1210, such as a magnetic disk, optical disk, or USB thumb drive (Flash drive), etc., is provided and coupled to bus 1202 for storing information and instructions.

The computer system 1200 may be coupled via bus 1202 to a display 1212, such as a liquid crystal display (LCD) (or touch screen), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. In some embodiments, the same direction information and command selections as cursor control may be implemented via receiving touches on a touch screen without a cursor.

The computing system 1200 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 1200 may implement the techniques described herein using customized hard-wired logic, one or more ASICs or FPGAs, firmware and/or program logic which in combination with the computer system causes or programs computer system 1200 to be a special-purpose machine. According to one embodiment, the techniques herein are performed by computer system 1200 in response to processor(s) 1204 executing one or more sequences of one or more instructions contained in main memory 1206. Such instructions may be read into main memory 1206 from another storage medium, such as storage device 1210. Execution of the sequences of instructions contained in main memory 1206 causes processor(s) 1204 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1210. Volatile media includes dynamic memory, such as main memory 1206. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1202. Transmission media can also take the form of acoustic or light waves, such as those generated during radio-wave and infra-red data communications.

The computer system 1200 also includes a communication interface 1218 coupled to bus 1202. Network interface 1218 provides a two-way data communication coupling to one or more network links that are connected to one or more local networks. For example, communication interface 1218 may be an integrated services digital network (ISDN) card, cable modem, satellite modem, or a modem to provide a data communication connection to a corresponding type of telephone line. As another example, network interface 1218 may be a local area network (LAN) card to provide a data communication connection to a compatible LAN (or WAN component to communicated with a WAN). Wireless links may also be implemented. In any such implementation, network interface 1218 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 1218, which carry the digital data to and from computer system 1200, are example forms of transmission media.

The computer system 1200 can send messages and receive data, including program code, through the network (s), network link and communication interface 1218. In the Internet example, a server might transmit a requested code for an application program through the Internet, the ISP, the local network and the communication interface 1218.

The received code may be executed by processor 1204 as it is received, and/or stored in storage device 1210, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing"

environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 1200.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. An optical device comprising:
a directional coupler comprising a first phase-shift mechanism;
an interferometer coupled to the directional coupler, the interferometer comprising:
a first branch comprising a first waveguide formed of a first material and a second waveguide formed of a second material dissimilar to the first material,
a second branch comprising a third waveguide formed of the first material, and
a second phase-shift mechanism coupled to the first waveguide; and
a microring resonator coupled to the second waveguide, the microring resonator formed of the second material and comprising a third phase-shift mechanism,
wherein the first, second, and third phase-shift mechanisms are configured to control biases of the optical device to achieve a desired activation function.

2. The optical device of claim 1, wherein the second material is a low loss material having a linear loss coefficient that is less than 200 dB/m.

3. The optical device of claim 1, wherein the second material has a bandgap that is greater than 1.9 eV.

4. The optical device of claim 1, wherein the second material has a nonlinear refractive index that is greater than $3 \times 10^{-20}$ m$^2$/W.

5. The optical device of claim 1, wherein the second material is aluminum gallium arsenide (AlGaAs).

6. The optical device of claim 1, wherein the second material is tantalum pentoxide (Ta$_2$O$_5$).

7. The optical device of claim 1, wherein a ratio of a nonlinear refractive index to a linear loss coefficient of the second material is larger than $3 \times 10^{-20}$.

8. The optical device of claim 1, wherein the first waveguide comprises a junction end coupled to a junction end of the second waveguide, the optical device further comprising:
a first inverse taper pair comprising a first taper at the junction end of the first waveguide and a second taper at the junction end of the second waveguide, wherein the first taper is in an inverse direction relative to the second taper.

9. The optical device of claim 1, wherein at least the third phase-shift mechanism comprises at least one of: a heterogeneous metal oxide semiconductor (MOS) phase shifter and a heater.

10. The optical device of claim 1, wherein at least the third phase-shift mechanism comprises a heterogeneous metal oxide semiconductor (MOS) capacitor.

11. The optical device of claim 1, wherein the directional coupler is a Mach-Zehnder coupler and the interferometer is a Mach-Zehnder interferometer.

12. A nonlinear activation device, comprising:
a Mach-Zehnder coupler (MZC) comprising a first phase-shift mechanism;
a Mach-Zehnder interferometer (MZI) coupled to the MZC, the MZI comprising a first branch that includes a first waveguide formed of a first material and a second waveguide formed of a second material that is dissimilar to the first material, and a second phase-shift mechanism coupled to the first waveguide; and
a microring resonator (MRR) coupled to the second waveguide, the microring resonator formed of the second material,
wherein the first and second phase-shift mechanisms are configured to control biases of the nonlinear activation device to switchably achieve a desired activation function,
wherein the second material comprises at least one of: (i) a bandgap over 1.9 eV; (ii) a nonlinear refractive index that is greater than $3 \times 10^{-20}$ m$^2$/W, and (iii) a linear loss coefficient that is less than 200 dB/m.

13. The nonlinear activation device of claim 12, wherein a ratio of a nonlinear refractive index to a linear loss coefficient of the second material is larger than $5 \times 10^{-20}$.

14. The nonlinear activation device of claim 12, wherein the second material is aluminum gallium arsenide (AlGaAs).

15. The nonlinear activation device of claim 12, wherein the second material is tantalum pentoxide ($Ta_2O_5$).

16. The nonlinear activation device of claim 12, wherein the first waveguide comprises a first junction end coupled to a second junction end of the second waveguide, the optical device further comprising:
    a first inverse taper pair comprising a first taper at the first junction end of the first waveguide and a second taper at the second junction end of the second waveguide, wherein the first taper is in an inverse direction relative to the second taper.

17. The nonlinear activation device of claim 16, wherein the first waveguide comprises a third junction end coupled to a fourth junction end of the second waveguide, the optical device further comprising:
    a second inverse taper pair comprising a third taper at the third junction end of the first waveguide and a fourth taper at the fourth junction end of the second waveguide, wherein the third taper is inverse relative to the fourth taper and inverse relative to the first taper.

18. A method for operating a nonlinear activation device, the method comprising:
    adjusting a first bias of a Mach-Zehnder interferometer (MZI) included in the nonlinear activation device by controlling a first phase-shift mechanism of the MZI to tune a phase difference between branches of the MZI, wherein the first phase-shift mechanism is coupled to a first waveguide of a first branch of the MZI;
    adjusting a second bias of a microring resonator (MRR), coupled to a second waveguide of the first branch of the MZI, such that the nonlinear activation device functions at approximately a resonance frequency of the MRR by controlling a second phase-shift mechanism of the MRR, the MRR is formed of a second material comprising at least one of: (i) a bandgap over 1.9 eV; (ii) a nonlinear refractive index that is greater than $3 \times 10^{-20}$ $m^2/W$, and (iii) a linear loss coefficient that is less than 200 dB/m; and
    adjusting a third bias of a Mach-Zehnder coupler (MZC), coupled to the MZI, to tune amplitudes of the branches of the MZI relative to one another by controlling a third phase-shift mechanism of the MZC,
    wherein the first, second, and third bias are controlled to achieve a desired activation function, and
    wherein the first waveguide is formed of a first material and the second waveguide is formed of the second material that is dissimilar to the first material.

19. The method of claim 18, wherein the first, second, and third phase-shift mechanisms each comprise one of a heterogeneous metal oxide semiconductor (MOS) phase shifter or a heater.

20. The method of claim 18, wherein the second material of the MRR is one of aluminum gallium arsenide (AlGaAs) and tantalum pentoxide ($Ta_2O_5$).

* * * * *